US012754604B2

(12) United States Patent
Spurlock et al.

(10) Patent No.: US 12,754,604 B2

(45) Date of Patent: Oct. 6, 2026

(54) INTENT-BASED USER INTERFACE MODIFICATIONS IN AN ARTIFICIAL REALITY ENVIRONMENT

(71) Applicant: Meta Platforms Technologies, LLC, Menlo Park, CA (US)

(72) Inventors: Jennifer Lynn Spurlock, Seattle, WA (US); Norah Riley Smith, Oakland, CA (US); Andrew C. Johnson, Somerville, MA (US); Matthew Alan Insley, Seattle, WA (US); Stella Muehlhaus, Obfelden (CH); Brandon Furtwangler, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/986,021

(22) Filed: Dec. 18, 2024

(65) Prior Publication Data

US 2026/0169549 A1 Jun. 18, 2026

(51) Int. Cl.

*G06F 3/01* (2006.01)
*G06T 13/40* (2011.01)
*G06T 19/00* (2011.01)

(52) U.S. Cl.

CPC .............. *G06F 3/011* (2013.01); *G06F 3/017* (2013.01); *G06T 13/40* (2013.01); *G06T 19/00* (2013.01);

(Continued)

(58) Field of Classification Search

CPC ..... G06T 19/00; G06T 13/40; G06T 2200/24; G06T 2210/62; G06F 3/011; G06F 3/017
See application file for complete search history.

(56) References Cited

U.S. PATENT DOCUMENTS

| | | | |
|---|---|---|---|
| 6,842,175 | B1 | 1/2005 | Schmalstieg et al. |
| 7,701,439 | B2 | 4/2010 | Hillis et al. |

(Continued)

FOREIGN PATENT DOCUMENTS

| | | |
|---|---|---|
| CN | 106716332 A | 5/2017 |
| CN | 108536273 A | 9/2018 |

(Continued)

OTHER PUBLICATIONS

International Search Report and Written Opinion for International Application No. PCT/US2024/036906, mailed Oct. 17, 2024, 14 pages.

(Continued)

*Primary Examiner* — Adam R. Giesy

(74) *Attorney, Agent, or Firm* — Potomac Law Group, PLLC; Dannon G. Allbee

(57) ABSTRACT

Aspects of the present disclosure can modify a user interface of an artificial reality system based on an ascertained intent of the user. For example, some implementations can “lock” a user’s virtual hand to a virtual object displayed on the user interface when a user intends to interact with it with their physical hand, instead of tracking the physical hand with the virtual hand. While the virtual hand is “locked” to the virtual object, some implementations can further A) render another representation of the physical hand, separate from the virtual hand, corresponding to the actual location of the physical hand, B) render a visual affordance on the virtual hand based on movement of the physical hand, and/or C) restrict the amount of wrist rotation that is shown by the virtual hand when the physical hand interacts with the virtual object.

20 Claims, 15 Drawing Sheets

(52) U.S. Cl.
CPC ...... *G06T 2200/24* (2013.01); *G06T 2210/62* (2013.01)

(56) References Cited

U.S. PATENT DOCUMENTS 8,558,759 B1 10/2013 Prada Gomez et al.
8,836,768 B1 9/2014 Rafii et al.
8,947,351 B1 2/2015 Noble
9,117,274 B2 8/2015 Liao et al.
9,292,089 B1 3/2016 Sadek
9,406,277 B1 8/2016 Letourneur
9,477,303 B2 10/2016 Fleischmann et al.
9,477,324 B2 10/2016 Ajmera et al.
9,477,368 B1 10/2016 Filip et al.
9,817,472 B2 11/2017 Lee et al.
10,042,430 B2 8/2018 Bedikian et al.
10,187,936 B1 1/2019 Letourneur
10,220,303 B1 3/2019 Schmidt et al.
10,248,284 B2 4/2019 Itani et al.
10,318,100 B2 6/2019 Abercrombie et al.
10,473,935 B1 11/2019 Gribetz et al.
10,488,939 B2 11/2019 Karmon et al.
10,515,484 B1 * 12/2019 Lucas ..................... G06F 3/011
10,521,944 B2 12/2019 Sareen et al.
10,536,691 B2 1/2020 Valdivia et al.
10,595,011 B2 3/2020 Han et al.
10,607,413 B1 3/2020 Marcolina et al.
10,691,233 B2 6/2020 Dalton et al.
10,890,983 B2 1/2021 Ravasz et al.
10,901,506 B2 1/2021 Wu et al.
10,956,724 B1 3/2021 Terrano
10,957,059 B1 3/2021 Katz et al.
11,079,753 B1 8/2021 Roy
11,221,730 B2 1/2022 Murphy et al.
11,307,671 B2 4/2022 Liu et al.
11,514,650 B2 11/2022 Kim et al.
11,991,222 B1 5/2024 Walton et al.
2004/0236541 A1 11/2004 Kramer et al.
2008/0089587 A1 4/2008 Kim et al.
2009/0077504 A1 3/2009 Bell et al.
2010/0306716 A1 12/2010 Perez
2011/0239155 A1 9/2011 Christie
2011/0267265 A1 11/2011 Stinson
2012/0013613 A1 1/2012 Vesely
2012/0069168 A1 3/2012 Huang et al.
2012/0071892 A1 3/2012 Itkowitz et al.
2012/0113223 A1 5/2012 Hilliges et al.
2012/0143358 A1 6/2012 Adams et al.
2012/0188279 A1 7/2012 Demaine
2012/0206345 A1 8/2012 Langridge
2012/0218183 A1 8/2012 Givon et al.
2012/0218395 A1 8/2012 Andersen et al.
2012/0249740 A1 10/2012 Lee et al.
2012/0249741 A1 10/2012 Maciocci et al.
2012/0275686 A1 11/2012 Wilson et al.
2012/0293544 A1 11/2012 Miyamoto et al.
2013/0063345 A1 3/2013 Maeda
2013/0125066 A1 5/2013 Klein et al.
2013/0147793 A1 6/2013 Jeon et al.
2013/0182902 A1 7/2013 Holz
2013/0265220 A1 10/2013 Fleischmann et al.
2014/0007484 A1 1/2014 Erdoss et al.
2014/0125598 A1 5/2014 Cheng et al.
2014/0204002 A1 7/2014 Bennet et al.
2014/0236996 A1 8/2014 Masuko et al.
2014/0268360 A1 9/2014 Ellsworth
2014/0306891 A1 10/2014 Latta et al.
2014/0357366 A1 12/2014 Koganezawa et al.
2014/0375691 A1 12/2014 Kasahara
2015/0035746 A1 2/2015 Cockburn et al.
2015/0040040 A1 2/2015 Balan et al.
2015/0054742 A1 2/2015 Imoto et al.
2015/0062160 A1 3/2015 Sakamoto et al.
2015/0110285 A1 4/2015 Censo et al.
2015/0153833 A1 6/2015 Pinault et al.
2015/0160736 A1 6/2015 Fujiwara
2015/0169076 A1 6/2015 Cohen et al.
2015/0178985 A1 6/2015 Di Censo et al.
2015/0181679 A1 6/2015 Liao et al.
2015/0206321 A1 7/2015 Scavezze et al.
2015/0220150 A1 8/2015 Plagemann et al.
2015/0243100 A1 8/2015 Abovitz et al.
2015/0261659 A1 9/2015 Bader et al.
2015/0269783 A1 9/2015 Yun
2016/0026253 A1 1/2016 Bradski et al.
2016/0110052 A1 4/2016 Kim et al.
2016/0147308 A1 5/2016 Gelman et al.
2016/0170603 A1 6/2016 Bastien et al.
2016/0217614 A1 7/2016 Kraver et al.
2016/0378291 A1 12/2016 Pokrzywka
2016/0379660 A1 12/2016 Wright et al.
2017/0003784 A1 1/2017 Garg et al.
2017/0031503 A1 * 2/2017 Rosenberg .............. G06F 3/045
2017/0050542 A1 2/2017 Shigeta et al.
2017/0060230 A1 3/2017 Faaborg et al.
2017/0109936 A1 4/2017 Powderly et al.
2017/0139478 A1 5/2017 Jeon et al.
2017/0139481 A1 5/2017 Long
2017/0192513 A1 7/2017 Karmon et al.
2017/0206691 A1 7/2017 Harrises et al.
2017/0228130 A1 8/2017 Palmaro
2017/0262063 A1 9/2017 Blénessy et al.
2017/0263033 A1 9/2017 Church
2017/0278304 A1 9/2017 Hildreth et al.
2017/0287225 A1 10/2017 Powderly et al.
2017/0296363 A1 10/2017 Yetkin et al.
2017/0308166 A1 10/2017 Mallinson
2017/0323483 A1 * 11/2017 Palmaro .................. G06T 19/20
2017/0329515 A1 11/2017 Clement et al.
2017/0337742 A1 11/2017 Powderly et al.
2017/0364198 A1 12/2017 Yoganandan et al.
2018/0004283 A1 1/2018 Mathey-Owens et al.
2018/0033204 A1 2/2018 Dimitrov et al.
2018/0039341 A1 2/2018 Du Bois et al.
2018/0046245 A1 2/2018 Schwarz et al.
2018/0059788 A1 3/2018 Noguchi et al.
2018/0059901 A1 3/2018 Gullicksen
2018/0107278 A1 4/2018 Goel et al.
2018/0113599 A1 4/2018 Yin
2018/0157398 A1 6/2018 Kaehler et al.
2018/0188816 A1 7/2018 Liu et al.
2018/0303446 A1 10/2018 Schweizer
2018/0307303 A1 10/2018 Powderly et al.
2018/0322701 A1 11/2018 Pahud et al.
2018/0323992 A1 11/2018 Harms et al.
2018/0329492 A1 11/2018 Coppin et al.
2018/0335925 A1 11/2018 Hsiao et al.
2018/0357780 A1 12/2018 Young et al.
2018/0361234 A1 12/2018 Nietfeld et al.
2019/0018498 A1 1/2019 West et al.
2019/0050071 A1 2/2019 Liu et al.
2019/0057531 A1 2/2019 Sareen et al.
2019/0094981 A1 3/2019 Bradski et al.
2019/0107894 A1 4/2019 Hebbalaguppe et al.
2019/0120593 A1 4/2019 Randles
2019/0129607 A1 5/2019 Saurabh et al.
2019/0130653 A1 5/2019 Kuehne
2019/0138107 A1 5/2019 Nietfeld et al.
2019/0146599 A1 5/2019 Gunnarsson et al.
2019/0213792 A1 7/2019 Jakubzak et al.
2019/0258318 A1 8/2019 Qin et al.
2019/0265828 A1 8/2019 Hauenstein et al.
2019/0278376 A1 9/2019 Kutliroff et al.
2019/0279424 A1 9/2019 Clausen et al.
2019/0286231 A1 9/2019 Burns et al.
2019/0290999 A1 9/2019 Bradner et al.
2019/0318640 A1 10/2019 Goel et al.
2019/0324549 A1 10/2019 Araki et al.
2019/0325651 A1 10/2019 Bradner et al.
2019/0347865 A1 11/2019 Hackett et al.
2019/0361521 A1 11/2019 Stellmach et al.
2019/0362562 A1 11/2019 Benson
2019/0369391 A1 12/2019 Cordesses et al.
2019/0377416 A1 12/2019 Alexander

(56) References Cited

U.S. PATENT DOCUMENTS

| | | | |
|---|---|---|---|
| 2019/0391710 | A1 | 12/2019 | Shen |
| 2020/0001172 | A1 | 1/2020 | Nicoli |
| 2020/0005026 | A1 | 1/2020 | Andersen et al. |
| 2020/0005539 | A1 | 1/2020 | Hwang et al. |
| 2020/0005541 | A1 | 1/2020 | Preston |
| 2020/0012341 | A1 | 1/2020 | Stellmach et al. |
| 2020/0074742 | A1 | 3/2020 | Rogers |
| 2020/0082629 | A1 | 3/2020 | Jones et al. |
| 2020/0097077 | A1 | 3/2020 | Nguyen et al. |
| 2020/0097091 | A1 | 3/2020 | Chou et al. |
| 2020/0129850 | A1 | 4/2020 | Ohashi |
| 2020/0159337 | A1 | 5/2020 | Kin et al. |
| 2020/0218423 | A1 | 7/2020 | Ohashi |
| 2020/0225736 | A1 | 7/2020 | Schwarz et al. |
| 2020/0225757 | A1 | 7/2020 | Schwarz et al. |
| 2020/0225758 | A1 | 7/2020 | Tang et al. |
| 2020/0225813 | A1 | 7/2020 | Schwarz et al. |
| 2020/0225830 | A1 | 7/2020 | Tang et al. |
| 2020/0226814 | A1 | 7/2020 | Tang et al. |
| 2020/0286299 | A1 | 9/2020 | Wang et al. |
| 2020/0379576 | A1 | 12/2020 | Chen et al. |
| 2020/0387228 | A1 | 12/2020 | Ravasz et al. |
| 2020/0387287 | A1 | 12/2020 | Ravasz et al. |
| 2020/0388247 | A1 | 12/2020 | Ravasz et al. |
| 2021/0076091 | A1 | 3/2021 | Shohara |
| 2021/0089127 | A1 | 3/2021 | Wu et al. |
| 2021/0096726 | A1 | 4/2021 | Faulkner et al. |
| 2021/0134065 | A1 | 5/2021 | Ramani et al. |
| 2021/0141461 | A1 | 5/2021 | Liu et al. |
| 2021/0183135 | A1 | 6/2021 | Lin et al. |
| 2021/0208698 | A1 | 7/2021 | Martin et al. |
| 2021/0373672 | A1 | 12/2021 | Schwarz et al. |
| 2022/0084279 | A1 | 3/2022 | Lindmeier et al. |
| 2022/0121344 | A1 | 4/2022 | Pastrana Vicente et al. |
| 2022/0147137 | A1 | 5/2022 | Johnston et al. |
| 2022/0156999 | A1 | 5/2022 | Assouline et al. |
| 2022/0163800 | A1 | 5/2022 | Yokokawa |
| 2022/0198755 | A1 | 6/2022 | Pinchon |
| 2022/0244834 | A1 | 8/2022 | Ravasz et al. |
| 2022/0262080 | A1 | 8/2022 | Burton et al. |
| 2022/0365739 | A1 | 11/2022 | Chang et al. |
| 2023/0031913 | A1 | 2/2023 | Ishikawa et al. |
| 2023/0040610 | A1 | 2/2023 | Buerli et al. |
| 2023/0072423 | A1 | 3/2023 | Osborn et al. |
| 2023/0139337 | A1 | 5/2023 | Noam et al. |
| 2023/0274512 | A1 | 8/2023 | Terre et al. |
| 2023/0343052 | A1 | 10/2023 | Kimura et al. |
| 2024/0019938 | A1 | 1/2024 | Whitmire et al. |
| 2024/0028129 | A1 | 1/2024 | Whitmire et al. |
| 2024/0045509 | A1 | 2/2024 | Holz |
| 2024/0112426 | A1 | 4/2024 | Berliner et al. |
| 2024/0201776 | A1 | 6/2024 | Jun et al. |
| 2024/0212302 | A1 | 6/2024 | Sorg et al. |
| 2024/0264660 | A1 | 8/2024 | Levatich et al. |
| 2024/0265656 | A1 | 8/2024 | Victor-Faichney et al. |
| 2024/0272764 | A1 | 8/2024 | Victor-Faichney et al. |
| 2024/0281070 | A1 | 8/2024 | Emami et al. |
| 2024/0281071 | A1 | 8/2024 | Emami et al. |
| 2024/0346751 | A1* | 10/2024 | Vizeu Oliveira ....... G06F 3/017 |
| 2024/0372901 | A1 | 11/2024 | Walton et al. |
| 2025/0054243 | A1 | 2/2025 | Selig et al. |
| 2025/0068297 | A1 | 2/2025 | Selig et al. |
| 2025/0103636 | A1 | 3/2025 | Chan et al. |
| 2025/0166536 | A1 | 5/2025 | Wang et al. |
| 2025/0348151 | A1 | 11/2025 | Emami et al. |

FOREIGN PATENT DOCUMENTS

| | | | |
|---|---|---|---|
| CN | 110134234 | B | 5/2022 |
| CN | 116339737 | A | 6/2023 |
| CN | 118045365 | A | 5/2024 |
| EP | 3155560 | A1 | 4/2017 |
| EP | 3155560 | B1 | 5/2020 |
| EP | 3188075 | B1 | 2/2023 |
| EP | 4145397 | A1 | 3/2023 |
| EP | 4386519 | A1 | 6/2024 |
| EP | 4189460 | B1 | 4/2025 |
| JP | 2015100032 | A | 5/2015 |
| JP | 2015176439 | A | 10/2015 |
| JP | 2015192436 | A | 11/2015 |
| JP | 2017529635 | A | 10/2017 |
| JP | 2023181132 | A | 12/2023 |
| KR | 20120136719 | A | 12/2012 |
| TW | 202313162 | A | 4/2023 |
| WO | 2014119258 | A1 | 8/2014 |
| WO | 2015192117 | A1 | 12/2015 |
| WO | 2017009707 | A1 | 1/2017 |
| WO | 2018067508 | A1 | 4/2018 |
| WO | 2018235371 | A1 | 12/2018 |
| WO | 2019245681 | A1 | 12/2019 |
| WO | 2022146938 | A1 | 7/2022 |

OTHER PUBLICATIONS

International Search Report and Written Opinion for International Application No. PCT/US2024/040999, mailed Dec. 2, 2024, 10 pages.

Notice of Allowance mailed May 22, 2025 for U.S. Appl. No. 18/095,946, filed Jan. 11, 2023, 5 pages.

Argelaguet F., et al., A Survey of 3D Object Selection Techniques for Virtual Environments, Computers Graphics,2013, vol. 37, No. 3, pp. 121-136.

Cardoso J., 'Comparison of Gesture, Gamepad, and Gaze-Based Locomotion for VR Worlds, Proceedings of the 22nd ACM Conference on Virtual Reality Software and Technology, Nov. 2, 2016, pp. 319-320.

European Search Report for European Patent Application No. 24154976.5, dated Jun. 7, 2024, 8 pages.

European Search Report for European Patent Application No. 24155225.6, dated May 2, 2024, 10 pages.

Fox B., et al., "Designing Singlehanded Shortcuts for VR AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.

International Preliminary Report on Patentability for International Application No. PCT/US2020/051763, mailed Mar. 31, 2022, 10 pages.

International Search Report and Written Opinion for International Application No. PCT/US2020/051763, mailed Feb. 3, 2021, 11 Pages.

International Search Report and Written Opinion for International Application No. PCT/US2021/063536 mailed Mar. 22, 2022, 12 pages.

International Search Report and Written Opinion for International Application No. PCT/US2023/017990, mailed Jul. 10, 2023, 9 pages.

International Search Report and Written Opinion of International Application No. PCT/US2020/035998, mailed Sep. 30, 2020, 16 pages.

Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.

Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.

(56) References Cited

OTHER PUBLICATIONS

Mardanbegi D., et al., "Eyesee Through: Unifying Tool Selection and Application in Virtual Environments," In 2019 IEEE Conference on Virtual Reality and 3D User Interfaces (VR), 2019, pp. 474-483.
Matsuda K., "Augmented City 3D [Official]," YouTube, Aug. 20, 2010, Retrieved from the Internet: URL: https://www.youtube.com/watch?v=3TL80ScTLIM, 1 page.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Mine M.R., et al., Moving Objects in Space: Exploiting Proprioception in Virtual-Environment Interaction, In Proceedings of the 24th Annual Conference on Computer Graphics and Interactive Techniques, 1997, pp. 19-26.
Newton A., "Immersive Menus Demo," YouTube, Oct. 8, 2017, Retrieved from the Internet: URL: https://www.youtube.com/watch?v =_ow1RboHJDY, 1 page.
Office Action mailed Apr. 9, 2024 for Japanese Patent Application No. 2021-555497, filed on Jun. 3, 2020, 4 pages.
Office Action mailed Sep. 19, 2023 for European Patent Application No. 20747255.6, filed on Dec. 7, 2021, 6 pages.
Office Action mailed Feb. 27, 2024 for Chinese Application No. 202080035337.X, filed Jun. 3, 2020, 8 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Pfeiffer, et al., "Gaze+ Pinch Interaction in Virtual Reality," Proceedings of the 5th Symposium on Spatial User Interaction, SUI '17, Oct. 16, 2017, pp. 99-108.
Prosecution History of U.S. Appl. No. 16/434,919, dated Apr. 2, 2020 through Dec. 15, 2020, 46 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Tomberlin M., et al., "Gauntlet: Travel Technique for Immersive Environments using Non-Dominant Hand," IEEE Virtual Reality (VR), Mar. 18, 2017, pp. 299-300.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Extended European Search Report for European Patent Application No. 26152580.2, dated Mar. 25, 2026, 9 pages.
International Preliminary Report on Patentability for International Application No. PCT/US2024/036906, mailed Mar. 5, 2026, 12 pages.
International Preliminary Report on Patentability for International Application No. PCT/US2024/040999, mailed Feb. 26, 2026, 8 pages.
Lolambean: "Getting around HoloLens 2," Microsoft Learn, Aug. 30, 2021, XP093333393, 11 pages, Retrieved from the Internet URL: https://learn.microsoft.com/en-us/hololens/hololens2-basic-usage.
Discord., "How to Enable and Use the Discord Overlay," Youtube.Com, Mar. 14, 2016, [Retrieved on May 28, 2024], 2 Pages, Retrieved from the Internet URL: https://www.youtube.com/watch?v=7xvpcXvNwJs.
International Preliminary Report on Patentability for International Application No. PCT/US2024/021541, mailed Nov. 13, 2025, 10 pages.
International Search Report and Written Opinion for International Application No. PCT/US2024/021541, mailed Jun. 10, 2024, 14 pages.
International Search Report and Written Opinion for International Application No. PCT/US2025/048371, mailed Jan. 5, 2026, 10 pages.
Office Action mailed Dec. 18, 2025 for European Patent Application No. 24155225.6, filed on Feb. 1, 2024, 9 pages.
Valem Tutorials., "How to Interact in VR—Oculus Interaction SDK—PART 1," YouTube, Mar. 14, 2022, 6 [Retrieved on Dec. 16, 2025], XP093347652, 2 pages, Retrieved from the Internet URL: https://www.youtube.com/watch?v=1FRqniErAfs&list=PLpEoiloH-4eMRR8wAfy22ecQeCT2tluMD.

* cited by examiner

INTENT-BASED USER INTERFACE MODIFICATIONS IN AN ARTIFICIAL REALITY ENVIRONMENT

TECHNICAL FIELD

The present disclosure is directed to user interface modifications, in an artificial reality (XR) environment, such as an augmented reality (AR), mixed reality (MR), or virtual reality (VR) environment, based on determined user intent.

BACKGROUND

Artificial reality (XR) devices are becoming more prevalent. As they become more popular, the applications implemented on such devices are becoming more sophisticated. Artificial reality applications can provide interactive 3D experiences that combine images of the real-world with virtual objects or that provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality systems can allow light to enter a user's eye that is partially generated by a computing system and partially includes light reflected off objects in the real-world. AR, MR, and VR experiences (together XR) can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
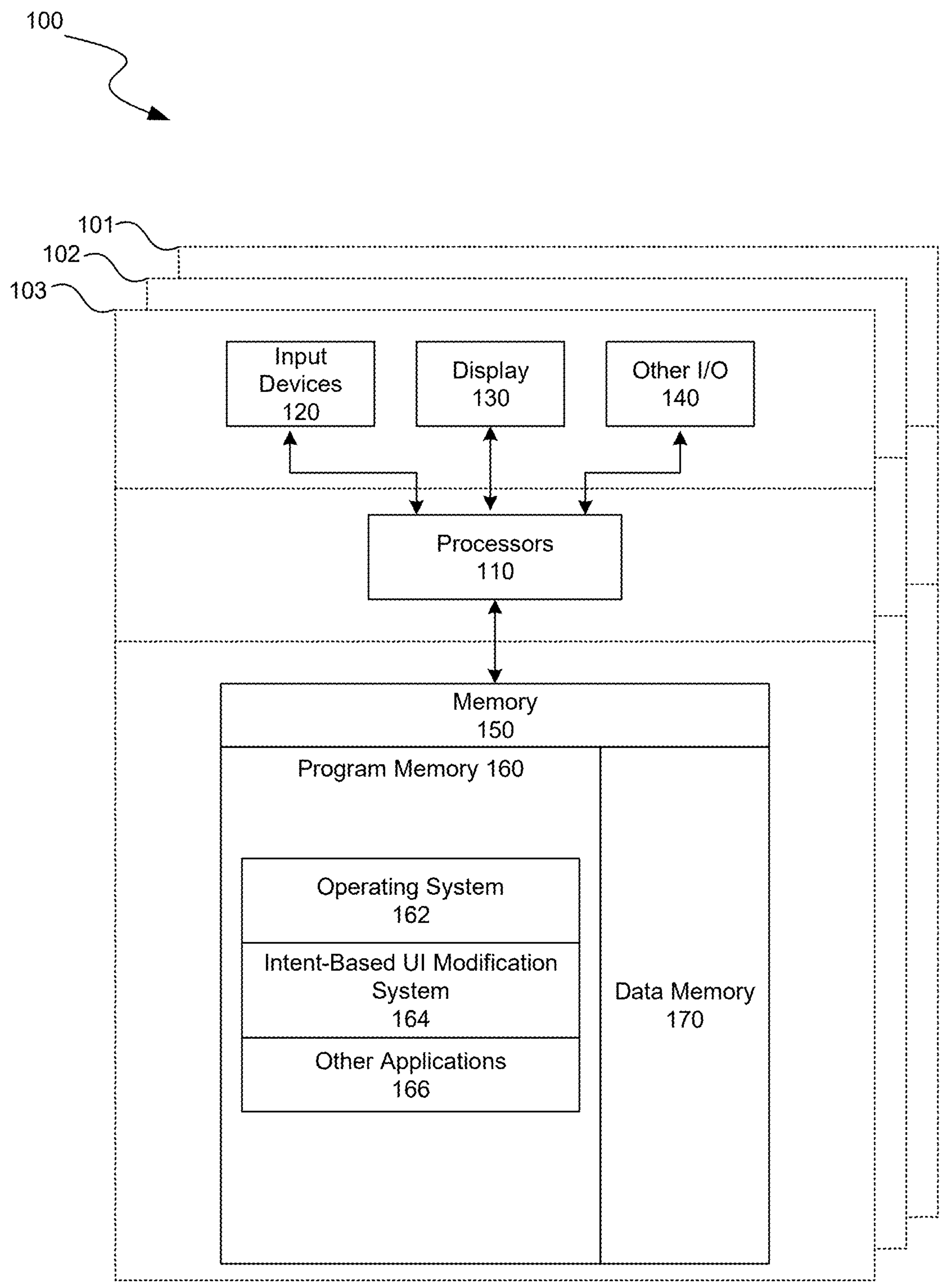
FIG. 1 is a block diagram illustrating an overview of devices on which some implementations of the present technology can operate.

Instead of always showing a user interface according to exact user motions, aspects of the present disclosure provide a smarter, more flexible user interface (UI) that can give a more realistic feel for user interactions in artificial reality (XR) experiences, such as augmented reality and virtual reality experiences. For example, an intent-based UI modification system can "lock" a user's virtual hand to a virtual object (i.e., a UI element) displayed on the user interface when a user intends to interact with it with their physical hand, instead of tracking the physical hand with the virtual hand. The system can determine a user's intent to interact with the virtual object based on the proximity of the physical hand to the virtual object, based on an interaction between the physical hand and the virtual object (e.g., the physical hand "touching" the virtual object, e.g., being at a location in the real-world environment corresponding to the location of the virtual object in the XR environment), etc.

While the virtual hand is "locked" to the virtual object, the system can further render a second representation of the physical hand, in addition to the virtual hand, corresponding to the actual location of the physical hand, in some implementations. For example, some implementations can show a "ghost hand" (i.e., another representation of the physical hand, such as a partially transparent virtual hand) at the location of the user's real-world hand when the real-world hand pushes too far through a virtual object. Thus, the modified user interface, including both the virtual hand and the "ghost hand", can visualize the discrepancy between the locations of the real-world hand and the virtual hand.

In another example, while the virtual hand is "locked" to the virtual object, the system can render a visual affordance on the virtual hand based on movement of the physical hand. For example, the system can provide a glow effect to the virtual hand that increases as the user's real-world hand overshoots the virtual object and/or virtual hand locked to the virtual object. In some examples, some implementations can render both a "ghost hand" in addition to the virtual hand, as well as a visual affordance on the ghost hand and/or virtual hand, in response to the user's real-world hand overshooting the virtual object.

In either or both implementations, once the user's real-world hand extends beyond a threshold distance of the virtual object, the "ghost hand" and/or visual affordance can deactivate, and the virtual hand can reconcile (e.g., "snap back" or more slowly glide back) to the position of the real-world hand, as the system determines that the user's intent is no longer to interact with the virtual object. In some cases, the system can first apply a visual affordance to the virtual hand when the user pushes a first threshold amount past the virtual object (e.g., 6 cm), then switch to a "ghost hand" when the user pushes a second threshold amount past the virtual object (e.g., at 10 cm), and finally determine the user is not intending to interact with the virtual object at a third threshold (e.g., at 20 cm), at which point the location of the virtual hand is reconciled with the location of the physical hand.

In still another example, while the virtual hand is "locked" to the virtual object, some implementations can restrict the amount of wrist rotation that is shown by the virtual hand when the physical hand interacts with the virtual object. For example, the system can take a snapshot of where the wrist rotation is as the user's real-world hand touches down on the virtual object. As the user's real-world hand continues onward beyond the virtual object, but the virtual hand is stopped by the virtual object, the virtual hand would otherwise arch and move upward visually, with the "touch down" point of the virtual hand on the virtual object acting as a pivot point for the virtual hand. To address this, the system can blend the current wrist rotation of the user's real-world hand with the wrist pose of the virtual hand to create a softer movement that prevents the virtual hand from floating continuously higher or moving awkwardly as the user's virtual finger is locked to the virtual object.

Restricting the amount of wrist rotation reflected by the virtual hand can serve further purposes in other examples. For example, because the fingertip is "snapped" or "locked" to the virtual object, the user may move their physical hand to the side a certain amount without realizing it while interacting with the virtual object, regardless of whether or not the physical hand is pushing through the virtual object. This can give an impression of the virtual hand being at an odd angle, that doesn't match what the physical hand is doing, causing a cognitive disconnect. Thus, once the system decides that the user is interacting with the virtual object (particularly a UI element that works in one dimension, such as a virtual button or lever), the system can limit the amount that the virtual wrist will rotate.

While several embodiments are described herein as being operable with a user's hand(s), these embodiments can alternatively be used with a controller. For example, instead of tracking a position of a user's hand, the system may provide interactions or affordances based on a tracked position of a controller.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The implementations described herein provide specific improvements in the field of artificial reality. Some implementations can "lock" a virtual hand to a virtual object when a user is interacting with the virtual object, such that subtle movements of the user's physical hand do not cause the virtual hand to cease interaction with the virtual object. Thus, modifying the user interface to include such "locking" can result in a more realistic user experience based on the intent of the user. Some implementations can provide visual affordances with respect to a virtual hand that can provide various indications to the user, such as how far the user's physical fingertip has extended beyond a contact surface of a virtual object to which the virtual fingertip is locked, such as a glow effect or a representation of the physical hand additional to the virtual hand. Further, some implementations can restrict wrist rotation of a virtual hand when the virtual hand applies pressure to a virtual object (e.g., based on the user's physical fingertip extending beyond the contact surface of the virtual object to which the virtual fingertip is locked), creating a softer movement that prevents the virtual hand from floating continuously higher or moving awkwardly. Such visual affordances thus result in efficiency of user interactions with virtual objects, communication of virtual object manipulations and/or interactions to users, and conserved resources on an XR system based on prevention of unintended or unwanted actions with respect to virtual objects.

Several implementations are discussed below in more detail in reference to the figures. FIG. 1 is a block diagram illustrating an overview of devices on which some implementations of the disclosed technology can operate. The devices can comprise hardware components of a computing system 100 that can provide intent-based user interface modifications in an artificial reality (XR) environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, grids, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, intent-based user modification system 164, and other application programs 166. Memory 150 can also include data memory 170 that can include, e.g., hand tracking data, virtual hand data, rendering data, physical hand data, virtual object data, proximity data, position data, motion data, rendering data, configuration data, settings, user options or preferences, etc., which can be provided to the program memory 160 or any element of the computing system 100.

In various implementations, the technology described herein can include a non-transitory computer-readable storage medium storing instructions, the instructions, when executed by a computing system, cause the computing system to perform steps as shown and described herein. In various implementations, the technology described herein can include a computing system comprising one or more processors and one or more memories storing instructions that, when executed by the one or more processors, cause the computing system to steps as shown and described herein.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
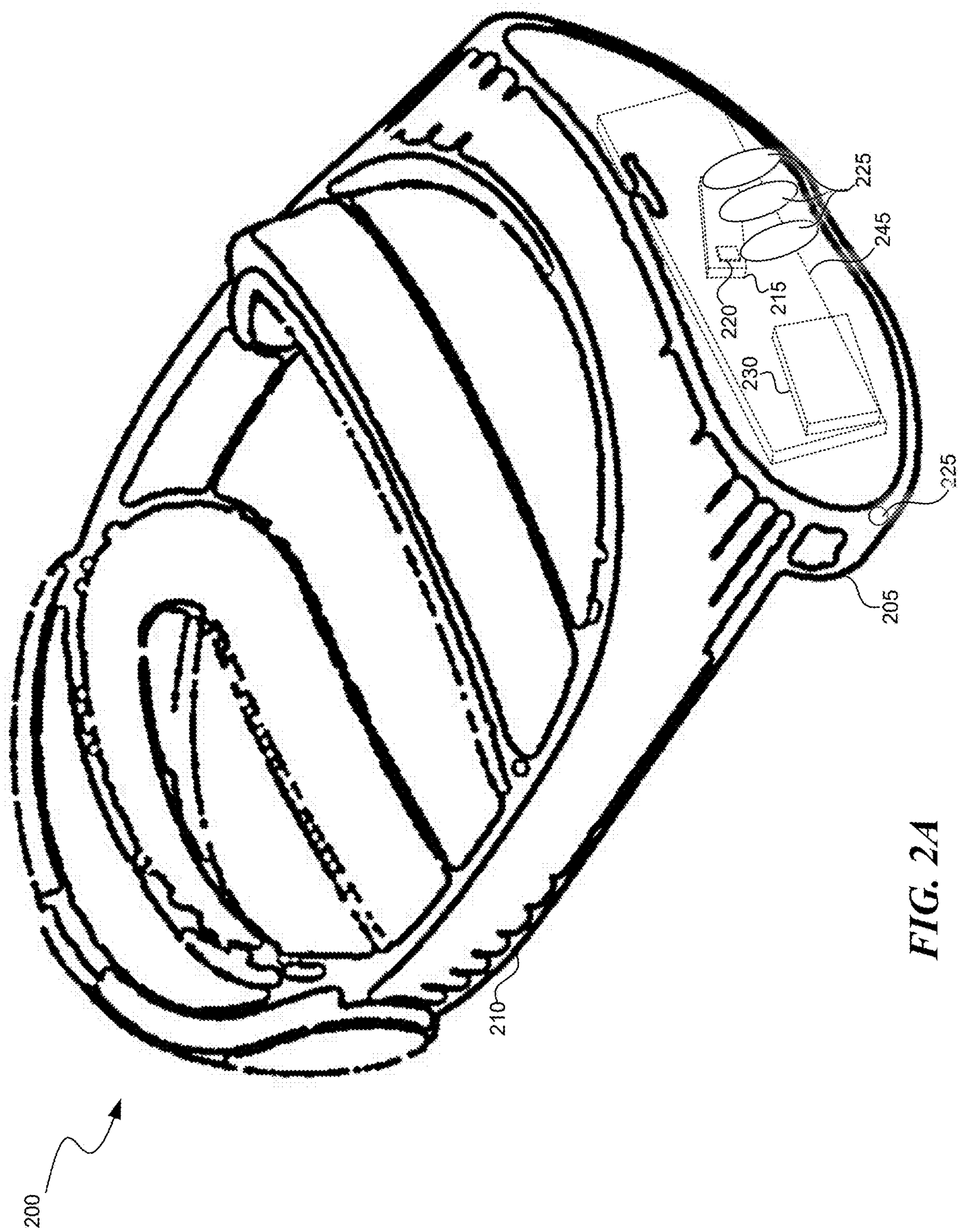
FIG. 2A is a wire diagram illustrating a virtual reality headset which can be used in some implementations of the present technology.

FIG. 2A is a wire diagram of a virtual reality head-mounted display (HMD) 200, in accordance with some embodiments. In this example, HMD 200 also includes augmented reality features, using passthrough cameras 225 to render portions of the real world, which can have computer generated overlays. The HMD 200 includes a front rigid body 205 and a band 210. The front rigid body 205 includes one or more electronic display elements of one or more electronic displays 245, an inertial motion unit (IMU) 215, one or more position sensors 220, cameras and locators 225, and one or more compute units 230. The position sensors 220, the IMU 215, and compute units 230 may be internal to the HMD 200 and may not be visible to the user. In various implementations, the IMU 215, position sensors 220, and cameras and locators 225 can track movement and location of the HMD 200 in the real world and in an artificial reality environment in three degrees of freedom (3DoF) or six degrees of freedom (6DoF). For example, locators 225 can emit infrared light beams which create light points on real objects around the HMD 200 and/or cameras 225 capture images of the real world and localize the HMD 200 within that real world environment. As another example, the IMU 215 can include e.g., one or more accelerometers, gyroscopes, magnetometers, other non-camera-based position, force, or orientation sensors, or combinations thereof, which can be used in the localization process. One or more cameras 225 integrated with the HMD 200 can detect the light points. Compute units 230 in the HMD 200 can use the detected light points and/or location points to extrapolate position and movement of the HMD 200 as well as to identify the shape and position of the real objects surrounding the HMD 200.

The electronic display(s) 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
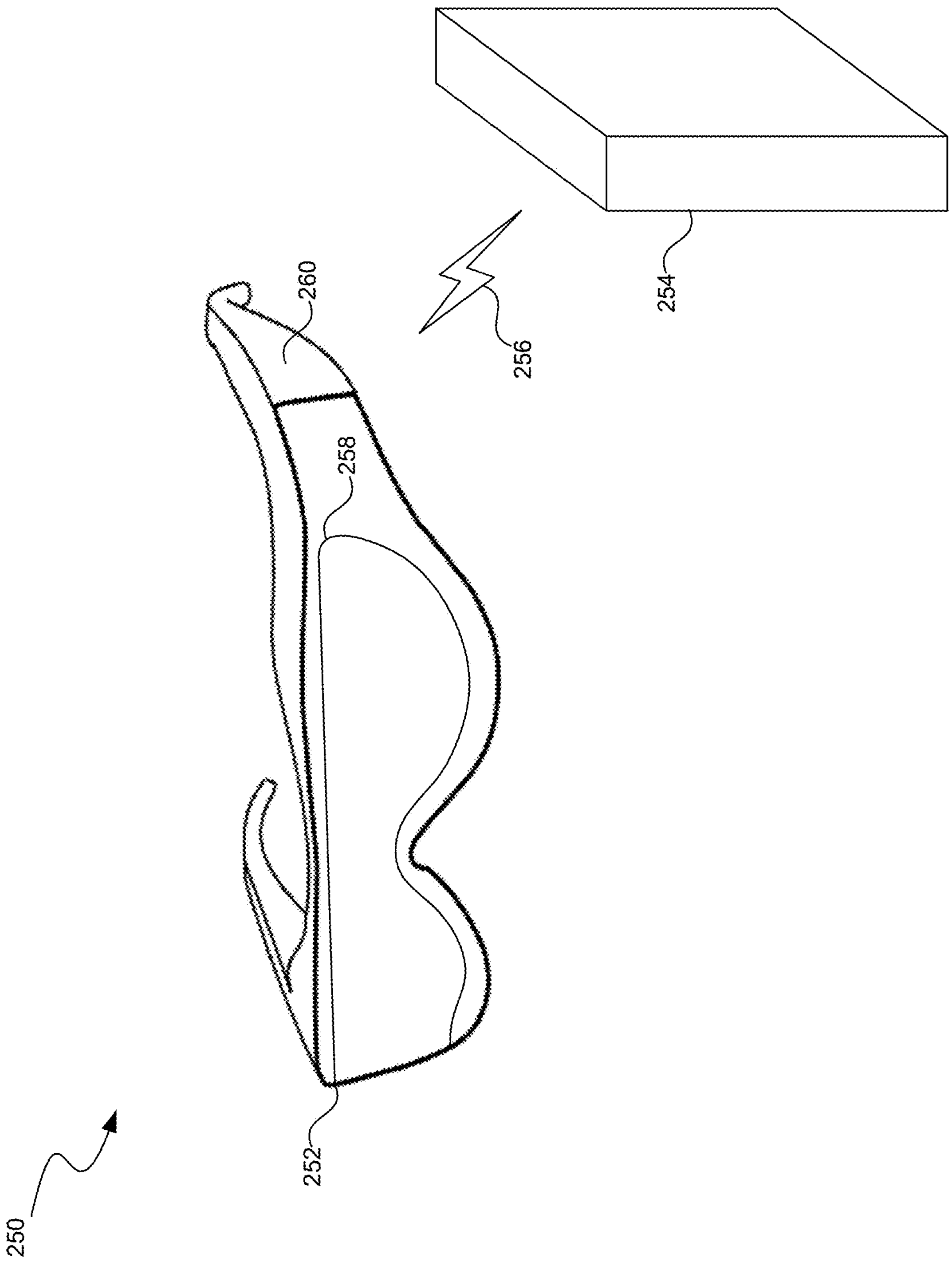
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
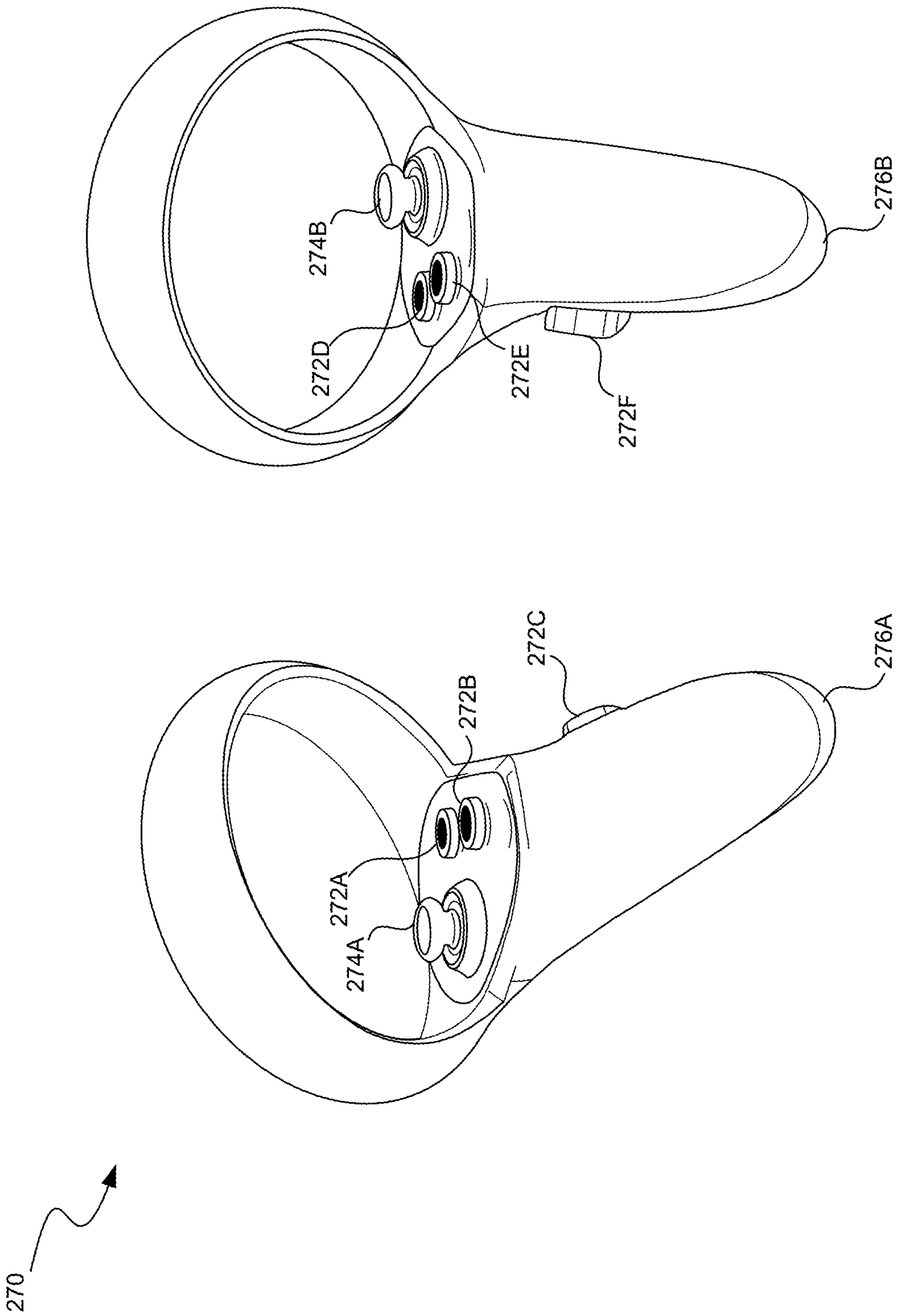
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
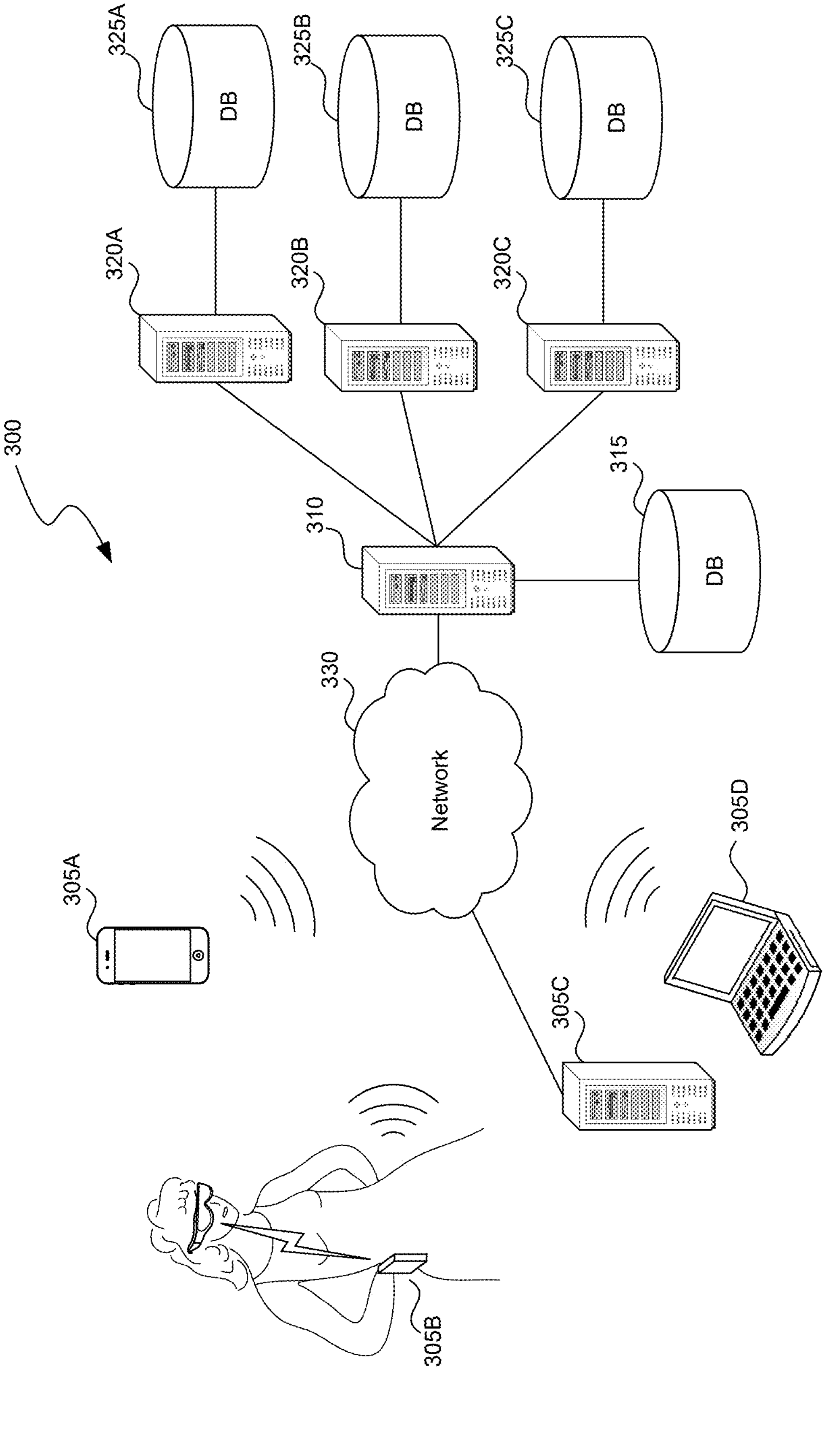
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
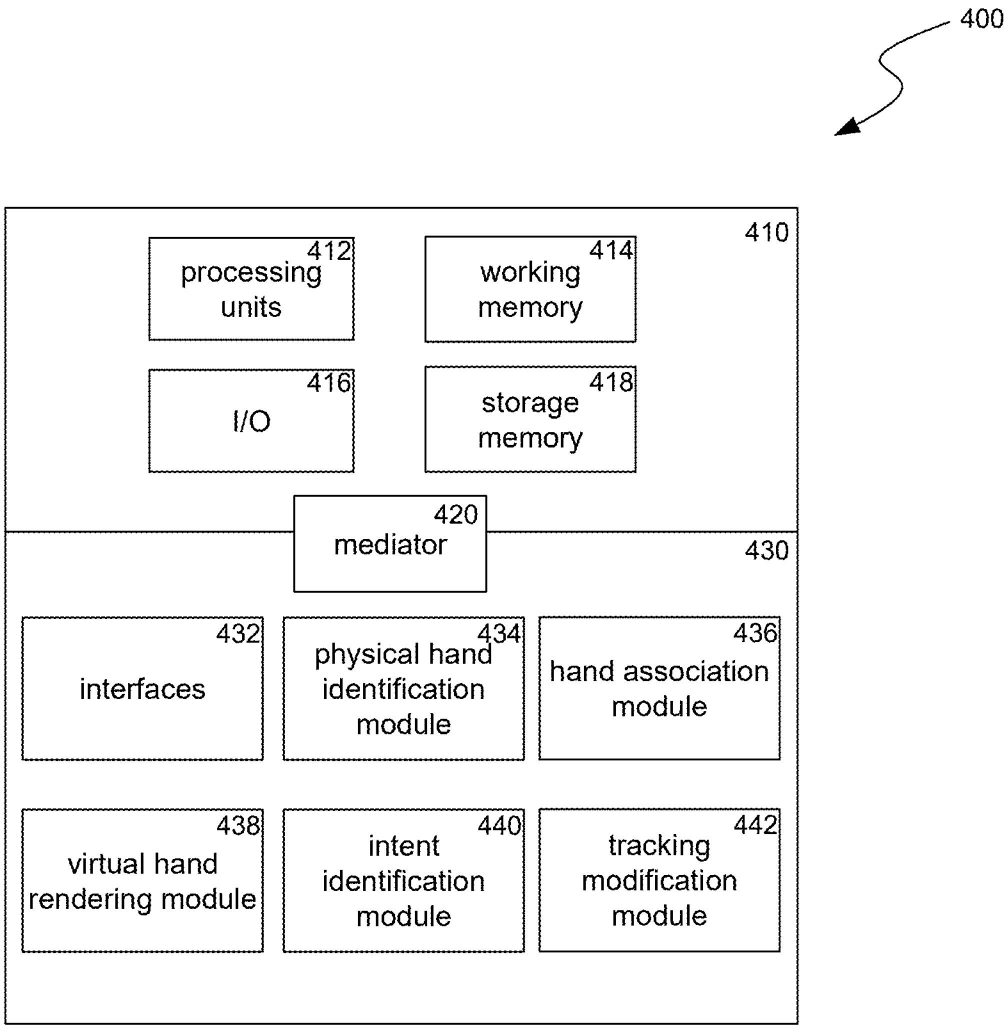
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing intent-based user interface modifications in an artificial reality (XR) environment. Specialized components 430 can include physical hand identification module 434, virtual hand association module 436, virtual hand rendering module 438, intent identification module 440, tracking modification module 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Physical hand identification module 434 can identify, by an XR system, a physical hand in a real-world environment of a user. Physical hand identification module 434 can identify and track the physical hand by, for example, capturing one or more images of the real-world environment of the user using one or more cameras and/or a hand or wrist wearable IMU unit in operable communication with physical hand identification module 434. From the one or more images and/or IMU data, physical hand identification module 434 can perform object recognition techniques to identify the physical hand and hand movement based on any combination of hand features, such as color, size, shape, curves, movement profiles, momentum, velocity, acceleration, etc. In some implementations, physical hand identification module 434 can track these features, such as by applying machine learning techniques. Further details regarding identifying and tracking a physical hand in a real-world environment of a user are described herein with respect to block 502 of FIG. 5, block 702 of FIG. 7, and block 902 of FIG. 9.

Hand association module 436 can associate the physical hand, identified by physical hand identification module 434, with a virtual hand in the XR environment. In some implementations, the virtual hand can be a visual representation of the physical hand in the XR environment. Hand association module 436 can associate the physical hand in the real-world environment with the virtual hand in the XR environment by, for example, correlating features of the physical hand to corresponding features of the virtual hand, such as fingers, joints, palms, etc. Further details regarding associating a physical hand with a virtual hand in an XR environment are described herein with respect to block 504 of FIG. 5, block 704 of FIG. 7, and block 904 of FIG. 9.

Virtual hand rendering module 438 can display the virtual hand on the XR system in the XR environment. In some implementations, the virtual hand can, at least initially, track motion of the physical hand in the real-world environment. In some implementations, the displayed virtual hand can be a first representation of at least a first portion of the physical hand. Based on the correlation between the virtual hand and the physical hand, made by hand association module 436, virtual hand rendering module 438 can display motions of the virtual hand (or portions thereof) corresponding to motions of the physical hand. For example, if the user makes a "thumbs up" motion with her physical hand in the real-world environment, virtual hand rendering module 438 can display a corresponding "thumbs up" motion on the virtual hand in the XR environment. Further details regarding displaying a virtual hand on an XR device in an XR environment are described herein with respect to block 506 of FIG. 5, block 706 of FIG. 7, and block 906 of FIG. 9.

Intent identification module 440 can identify an intent to interact with a virtual object by the user of the XR system. In some implementations, the intent can be a proximity of the physical hand with the virtual object (e.g., within a threshold distance, such as 1 cm). In some implementations, the intent can be a gesture toward the virtual object by the physical hand (and, correspondingly, by the virtual hand tracking motion of the physical hand). The gesture toward the virtual object can be a movement of the entire physical hand or can be a movement of a portion of the physical hand toward the virtual object (e.g., a pointing of a finger toward the virtual object, an opening of the fingers toward the virtual object, etc.).

Intent identification module 440 can identify the gesture toward the virtual object using, for example, one or more cameras, one or more depth sensors, and/or one or more sensors of an inertial measurement unit (IMU) integral with or in operable communication with the XR device. In some implementations, intent identification module 440 can perform object recognition and/or apply a machine learning model to identify the particular gesture toward the virtual object, which, in some implementations, can be indicative of a particular interaction the user wants to take with respect to the virtual object. For example, an opening of the palm toward the virtual object can indicate an intent to grab the virtual object, while a pointing of the finger toward the virtual object can indicate an intent to press or poke the virtual object. Further details regarding identifying an intent to interact with a virtual object by a user are described herein with respect to block 508 of FIG. 5, block 708 of FIG. 7, and block 908 of FIG. 9.

Tracking modification module 442 can, based on the intent identified by intent identification module 440, modify tracking of the virtual hand to be based on a position of the virtual object. Thus, a position of the virtual hand can be different from a position of the physical hand based on the user's intent to interact with the virtual object. For example, tracking modification module 442 can lock the virtual hand to the virtual object, such that movement of the physical hand within a specified distance of the virtual object does not cause the virtual hand to lose contact with the virtual object. In some implementations, tracking modification module 442 can revert to tracking the physical hand by the virtual hand when one or more portions of the physical hand move outside of a specified distance of the virtual object (e.g., based on a determination by intent identification module 440 that the user no longer intends to interact with the virtual object). Further details regarding modifying tracking of a virtual hand to be based on a position of a virtual object are described are described herein with respect to block 510 of FIG. 5 and block 710 of FIG. 7. In some implementations, tracking modification module 442 can, based on the intent identified by intent identification module 440, modify tracking of the virtual hand to be based on both a position of the virtual object and a position of the physical hand, as is described further with respect to block 910 of FIG. 9.

Virtual hand rendering module 438 can further update display of the virtual hand based on the modifications made by tracking modification module 442, such that interactions with the virtual object with the virtual hand are displayed. As noted above, the displayed position of the virtual hand, while interacting with the virtual object, can be different than the position of the physical hand in the real-world environment, thus allowing for a more natural interaction between the virtual hand and the virtual object. In some implementations, virtual hand rendering module 438 can display the virtual hand to be based on both a position of the physical hand and a position of the virtual object, as noted above. For example, virtual hand rendering module 438 can "lock" the virtual hand to the virtual object in at least one dimension (e.g., a z-axis direction), but can at least partially reflect the position of the physical hand in another dimension (e.g., a rotational direction), as is described further with respect to block 910 of FIG. 9.

In some implementations, virtual hand rendering module 438 can further display, in addition to the displayed virtual hand, a second representation of at least a second portion of the physical hand. The second representation can track a position of the at least the second portion of the physical hand, while the displayed virtual hand (i.e., the first representation of the at least the first portion of the physical hand) can be based on a position of the virtual object (e.g., pinned to, locked to, and/or snapped to the virtual object in at least one dimension). Thus, the second representation can indicate where the physical hand is located in the XR environment relative to where the virtual hand and/or virtual object are located. In some implementations, the second representation can be or include a pass-through view of the physical hand. Further details regarding displaying a second representation of at least a second portion of a physical hand are described herein with respect to block 512 of FIG. 5.

In some implementations, virtual hand rendering module 438 can further apply one or more visual affordances to the virtual object, the virtual hand and/or the second representation described above, while the virtual hand is interacting with the virtual object. In some implementations, virtual hand rendering module 438 can apply one or more visual affordances to the virtual object, the virtual hand, and/or the second representation described above when a specified point on the physical hand (e.g., the initial contact point of the physical hand with the virtual object) separates from a corresponding point on the virtual object by greater than a threshold distance (e.g., 2 cm). In some implementations, the visual affordance(s) can be dynamic, e.g., virtual hand rendering module 438 can increase the intensity, brightness, size, etc. of the visual affordance (e.g., a glow effect) as the specified points on the physical hand and virtual object become closer or further. In some implementations, virtual hand rendering module 438 can dynamically change visual affordance(s) via color, audio driven animations/effects, and/or other visual effects.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
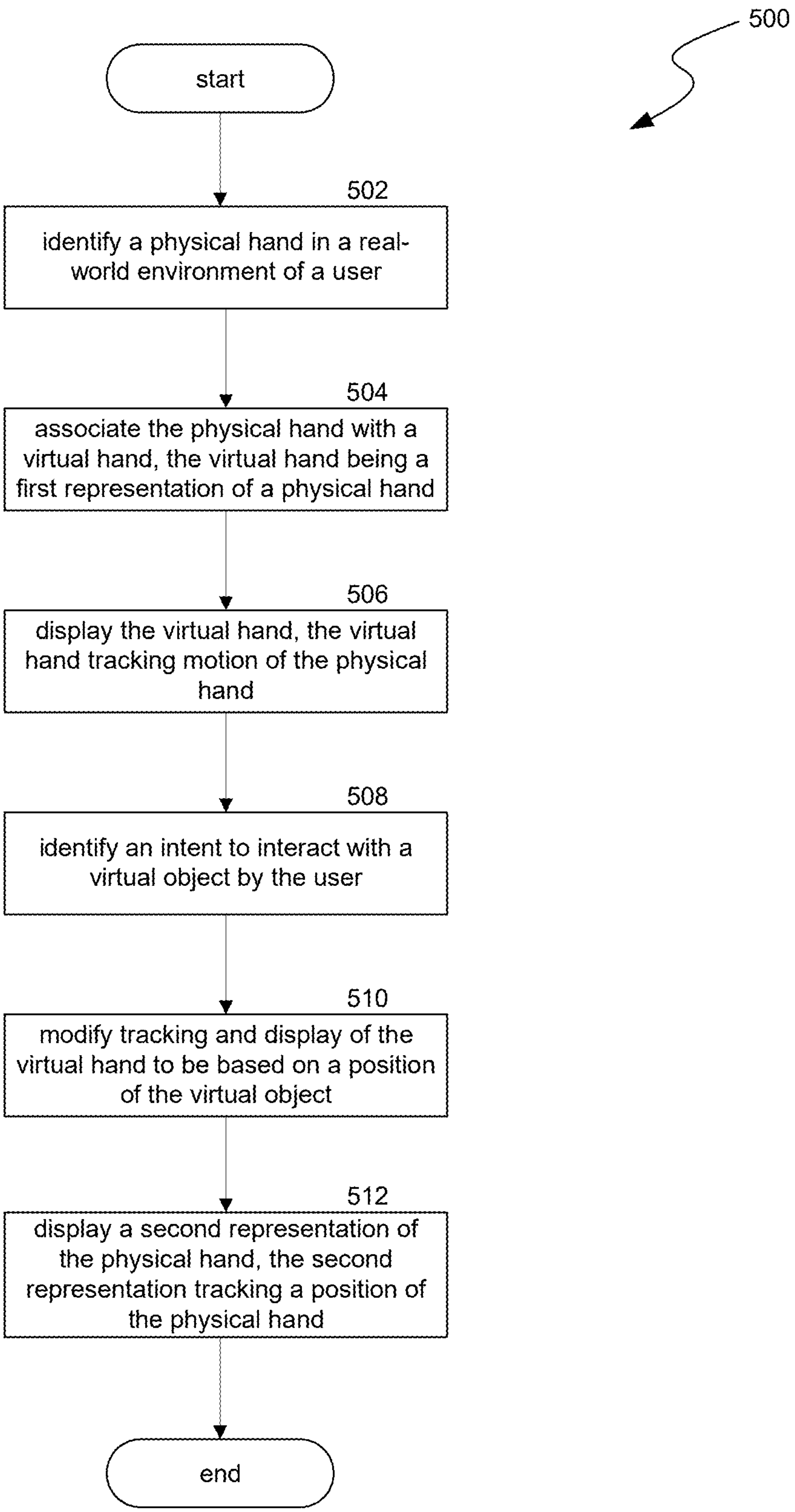
FIG. 5 is a flow diagram illustrating a process used in some implementations of the present technology for providing intent-based user interface modifications in an artificial reality environment, such as by providing dual virtual hand representations when at least a portion of a physical hand is separated from a virtual object.

FIG. 5 is a flow diagram illustrating a process 500 used in some implementations for providing intent-based user interface modifications in an artificial reality (XR) environment, such as by providing dual virtual hand representations when at least a portion of a physical hand extends beyond a virtual object. In some implementations, process 500 can be performed as a response to a physical hand of a user being detected in a real-world environment of a user by an XR system, the XR system displaying a virtual object with which the user can interact. In some implementations, some or all of process 500 can be performed by an XR system including one or more XR devices, e.g., an XR head-mounted display (HMD) (such as XR HMD 200 of FIG. 2A and/or XR HMD 252 of FIG. 2B), one or more external processing components, one or more controllers (e.g., controller 276A and/or 276B of FIG. 2C), etc.

At block 502, process 500 can identify, by an XR system, a physical hand (or controller) in a real-world environment of the user. In some implementations, process 500 can detect a physical hand of the user via one or more cameras integral with or in operable communication with the XR device. For example, process 500 can capture one or more images of the user's hand in front of the XR system. Process 500 can iteratively track the position of the user's hand as it relates to a coordinate system of the artificial reality environment. In some implementations, process 500 can use a machine learning model to identify the physical hand from the image(s). For example, process 500 can train a machine learning model with images capturing known hands, such as images showing various users'hands in various positions. Process 500 can identify relevant features in the images, such as edges, curves, and/or colors indicative of hand. Process 500 can train the machine learning model using these relevant features of known hands and position/pose information. Once the model is trained with sufficient data, process 500 can use the trained model to take relevant features for newly captured image(s) provide position information. For example, process 500 can apply a machine learning system trained to determine a position and/or pose of the hands in the environment or relative to the XR system, which can then be translated into the XR system's coordinate system.

At block 504, process 500 can associate the physical hand with a virtual hand in the XR environment. The virtual hand can be a first representation of at least a first portion of the physical hand. In some implementations, process 500 can associate the physical hand with the virtual hand by mapping one or more of the identified features of the physical hand to corresponding features of the virtual hand. For example, process 500 can map identified physical fingers to the virtual fingers of the virtual hand, physical palm to virtual palm of the virtual hand, and/or the like. In some implementations, process 500 can scale and/or resize captured features of the physical hand to correlate to the virtual hand, which can, in some implementations, have a default or predetermined size, shape, etc. In some implementations, process 500 can modify a "master" or generic virtual hand template to visually match the physical hand when associating the physical hand with the virtual hand. In some implementations, the virtual hand can be three-dimensional (3D) to more realistically represent the physical hand in the XR environment.

At block 506, process 500 can display the virtual hand. In some implementations, as described above, process 500 can display the virtual hand as a default or generic virtual hand to which features of the physical hand were mapped, while in some implementations, process 500 can display the virtual hand as a true representation of the physical hand, e.g., by modifying a renderable template of a virtual hand. In some implementations, process 500 can display the virtual hand in 3D, when the physical hand is mapped to the virtual hand in 3D. The virtual hand can track motion of the physical hand in the real-world environment. For example, by identifying, capturing, and following motion of the physical hand and its features, process 500 can display motion of the virtual hand correlating to motion of the physical hand, e.g., if the physical hand moves left six inches in the real-world environment, process 500 can display the virtual hand moving a corresponding virtual distance in the XR environment.

At block 508, process 500 can identify an intent to interact with a virtual object by the user based on an identified association between the virtual object and the physical hand. In some implementations, the identified association can be a proximity of the hand to a virtual object or a gesture toward the virtual object by the hand (e.g., within a specified distance). Process 500 can identify the gesture toward the virtual object by the hand by, for example, using one or more cameras integral with or in operable communication with the XR device. The one or more cameras can capture images of the physical hand moving toward a location in the real-world environment mapped to a virtual location in the XR environment in which the virtual object is located. In some implementations, process 500 can identify a gesture away from the user and toward a virtual object using one or more depth sensors integral with or in operable communication with the XR device.

In some implementations, the gesture toward the virtual object can be a motion of the physical hand. In some implementations, the gesture can include a particular posture of the physical hand, such as a pointing posture, an open hand posture, a grabbing posture, etc. In some implementations, process 500 can identify the posture of the physical hand similarly to how process 500 identifies the physical hand, such as by capturing images and performing object recognition, using machine learning models trained on images of particular postures, etc.

In some implementations, upon identification of the intent to interact with the virtual object, process 500 can apply one or more modifications to the XR environment and/or virtual object. For example, process 500 move the virtual object closer to the virtual hand in the XR environment, i.e., at a virtual location closer to the virtual location of the virtual hand, which can be tracking the location of the physical hand. In another example, process 500 can change a size of the virtual object (e.g. make it smaller or larger). In still another example, process 500 can add an accent to the virtual object (e.g., highlighting or coloring).

At block 510, based on the identified intent, process 500 can modify tracking and display of the virtual hand to be based on a position of the virtual object, such that a position of the virtual hand is different from a position of the physical hand. In other words, instead of the motion of the virtual hand being based on motion of the physical hand, motion of the virtual hand can be based on the position of the virtual object. For example, if the virtual object is within a threshold distance of the virtual hand, the virtual hand can "snap" to the virtual object and remain locked to the virtual object despite further motion of the physical hand, at least to some threshold distance, as described further herein. In another example, if the virtual hand interacts with the virtual object (i.e., touches the virtual object), the virtual hand can lock to the virtual object and remain locked to the virtual object despite further motion of the physical hand away from the virtual object, at least to some threshold distance, as described further herein.

In some implementations, process 500 can modify tracking and display of the virtual hand to be based on a position of the virtual object based on a determination that the position of a specified point on the physical hand is separated from a corresponding specified point on the virtual object by greater than a first threshold amount. The specified point on the physical hand can be a point on the physical hand at which the physical hand initially interacted with the virtual object (and/or last interacted with the virtual object when the physical hand continues interacting with the virtual object at that point on the physical hand). The corresponding specified point on the virtual object can be a point on the virtual object at which the specified point on the physical hand initially interacted with the virtual object (and/or last interacted with the virtual object when the physical hand continues interacting with the virtual object at that point on the physical hand). The first threshold amount can be any suitable amount, such as 1 cm.

Process 500 can determine such a separation between the physical hand and the virtual object using, e.g., one or more cameras and/or depth sensors. For example, process 500 can determine that the physical hand is moving away from a location in the real-world environment corresponding to a location in the XR environment where the virtual object is located. In some implementations, on the z-axis, the separation can be due to a retracting motion, i.e., a motion toward the user, while in other implementations on the z-axis, the separation can be due to a motion through the virtual object, i.e., a motion further away from the user past the virtual object. However, it is contemplated that the separation can alternatively or additionally be on the x-axis and/or y-axis, as described further herein. For example, when the physical hand extends a nominal amount beyond the virtual object, the virtual hand can remain locked to the virtual object.

In some implementations, process 500 can modify tracking and display of the virtual hand to be based on both a position of the virtual object and motion of the physical hand (e.g., partially on the position of the virtual object and partially on motion of the physical hand). For example, a particular point of the virtual hand can contact an initial point on the virtual object (e.g., a fingertip of a pointer finger can contact the center of a virtual object), and the virtual hand can lock to the virtual object at that initial point. However, if the user then moves their physical hand away from this initial point in a particular direction, the virtual hand can follow movement of the physical hand, while maintaining contact between the initial contact points, until the contact point of the physical hand with the virtual object separates from the virtual object by greater than a threshold distance. Once the physical hand separates from the virtual object by great than the threshold distance, the virtual hand can cease tracking motion of the physical hand, and remain locked to the virtual object at the last contact point of the physical hand with the virtual object.

The position of the virtual hand can be different from the position of the physical hand in any direction. In some implementations, the position of the virtual hand can be different from the position of the physical hand in a normal direction with respect to the virtual object (i.e., a z-axis direction perpendicular to a surface on which the virtual object resides). In some implementations in which the position of the virtual hand is different than the position of the physical hand in a z-axis direction, the virtual hand can continue to track motion of the physical hand in an x-axis and/or y-axis direction perpendicular to the z-axis direction, and/or in a rotational direction about the z-axis direction (i.e., roll rotation-clockwise or counterclockwise of the physical hand). In some implementations, the position of the virtual hand can be different from the position of the physical hand in an x- and/or y-axis direction perpendicular to the normal direction, and/or in a rotational direction about the z-axis direction, based on the position of the virtual object.

In some implementations, process 500 can modify display of the virtual object based on the virtual hand interacting with the virtual object. For example, if the interaction is a pressing motion, process 500 can virtually compress the virtual object in a z-axis direction (i.e., a normal direction relative to a surface on which the virtual object resides). In this example, the virtual hand can continue to track motion of the physical hand until the virtual object has reached its maximum compression, at which point process 500 can modify tracking and display of the virtual hand to be based on a position of the virtual object, instead of that of the physical hand.

At block 512, process 500 can display, in addition to the displayed virtual hand, a second representation of at least a second portion of the physical hand (e.g., another virtual hand corresponding to a portion of the physical hand). In other words, process 500 can display a "ghost hand" corresponding to the location of the physical hand relative to the location of the virtual hand, such that the user can ascertain where the physical hand is relative to where the virtual hand is rendered. The second representation can track a position of at least the second portion of the physical hand.

In some implementations, the second representation, of at least the second portion of the physical hand, can include at least one degradation relative to the displayed virtual hand. The at least one degradation can include one or more of fading, lightening, darkening, applying partial transparency, simplifying, outlining, or any combination thereof, relative to the displayed virtual hand (e.g., can be faded as compared to the displayed virtual hand, lighter than the displayed virtual hand, darker than the displayed virtual hand, more transparent than the displayed virtual hand, a simpler version of the displayed virtual hand (e.g., lower resolution, less polygons used for the second representation than the displayed virtual hand, etc.), include only an outline of the displayed virtual hand, etc. In some implementations, the second representation, of at least the second portion of the physical hand, cannot interact with and/or cause changes in the XR environment, other than to be displayed.

In some implementations, process 500 can further detect motion of the specified point on the physical hand away from the corresponding specified point on the virtual object by greater than a second threshold amount. The second threshold amount can be any suitable amount greater than the first threshold amount, such as at least 5 cm of separation, at least a dimension corresponding to the virtual object (e.g., separation from the virtual object by at least the length of the virtual object, the width of the virtual object, the thickness of the virtual object, etc.).

In some implementations, upon detecting such motion of the specified point of the physical hand away from the corresponding specified point on the virtual object, process 500 can modify tracking and display of the virtual hand to again be tracking motion of the physical hand, and can cease display of the second representation of at least the second portion of the physical hand. In other words, process 500 can determine that it is no longer the user's intent to interact with the virtual object, unlock the virtual hand from its interaction with the virtual object, and track the physical hand with the virtual hand in the XR environment. Process 500 can further remove the "ghost hand" from the XR environment, as the location of the physical hand again corresponds with the virtual hand, and the "ghost hand" would merely overlap with the virtual hand.

In some implementations, upon detecting such motion of the specified point of the physical hand away from the corresponding specified point on the virtual object, process 500 can "snap" the location of the virtual hand to the location of the physical hand. In other implementations, however, process 500 can transition display of the virtual hand to the position of the physical hand at a specified movement rate. In some implementations, the specified movement rate can be a constant rate, such that the transition of the virtual hand from its location at the virtual object to the position of the physical hand is gradual (e.g., is smooth without jumping from one location to the other).

Figure 6A:
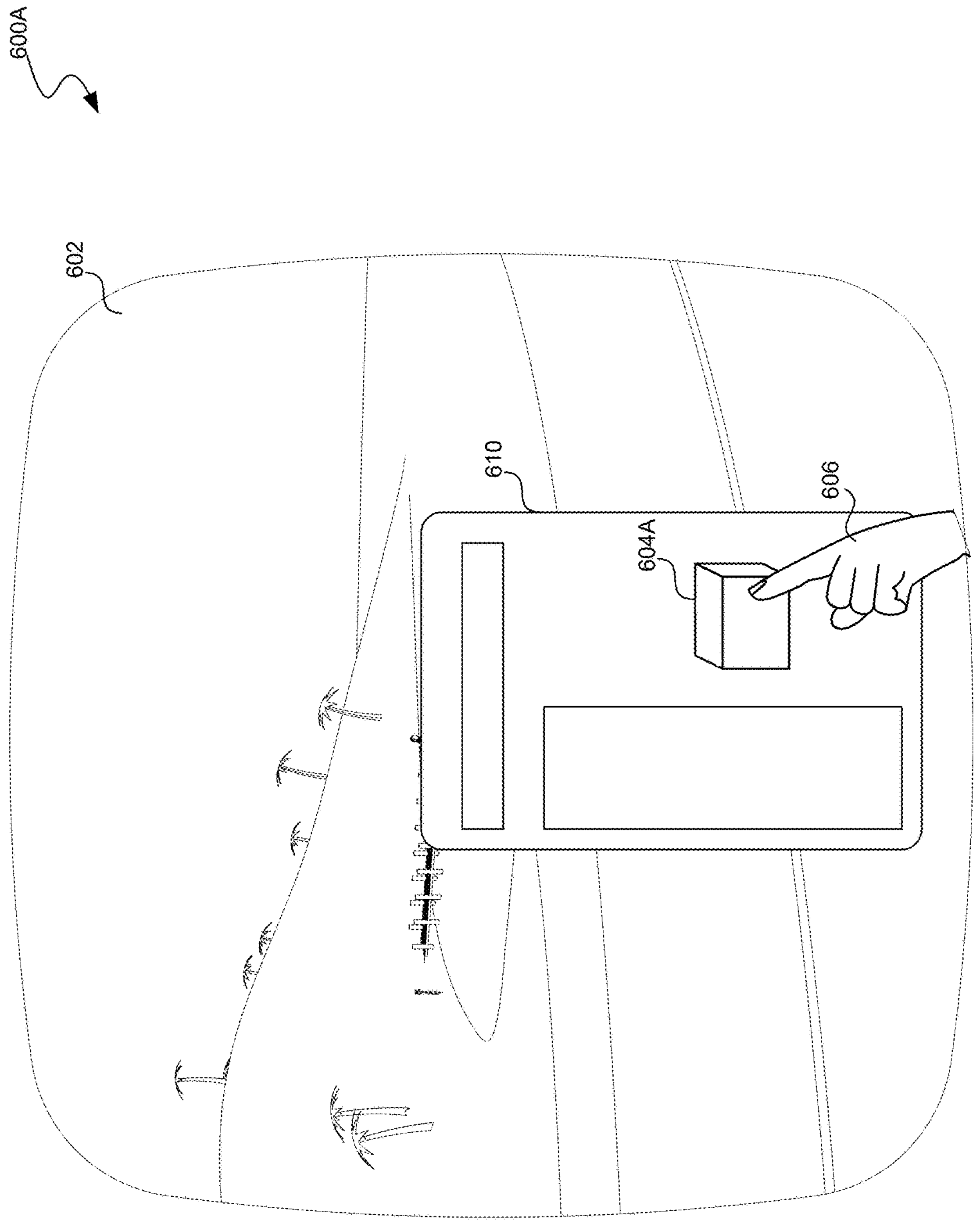
FIG. 6A is a conceptual diagram illustrating an example view from an artificial reality system of a first virtual hand and virtual button overlaid onto an artificial reality environment.

FIG. 6A is a conceptual diagram illustrating an example view 600A from an artificial reality (XR) system of a virtual hand 606 and virtual button 604A, included in a system UI 610, overlaid onto an XR environment 602. Virtual button 604A can be an exemplary virtual object with which a user of the XR device can interact. In view 600A, virtual hand 606 can track motion of a physical hand of the user of the XR system either A) prior to (or otherwise without) an interaction between virtual hand 606 and virtual button 604A, B) while the initial contact point on virtual hand 606 (e.g., the pointer fingertip) is interacting with virtual button 604A, C) while the initial contact point on virtual hand 606 is within a first threshold distance of virtual button 604A, or D) any combination thereof.

Figure 6B:
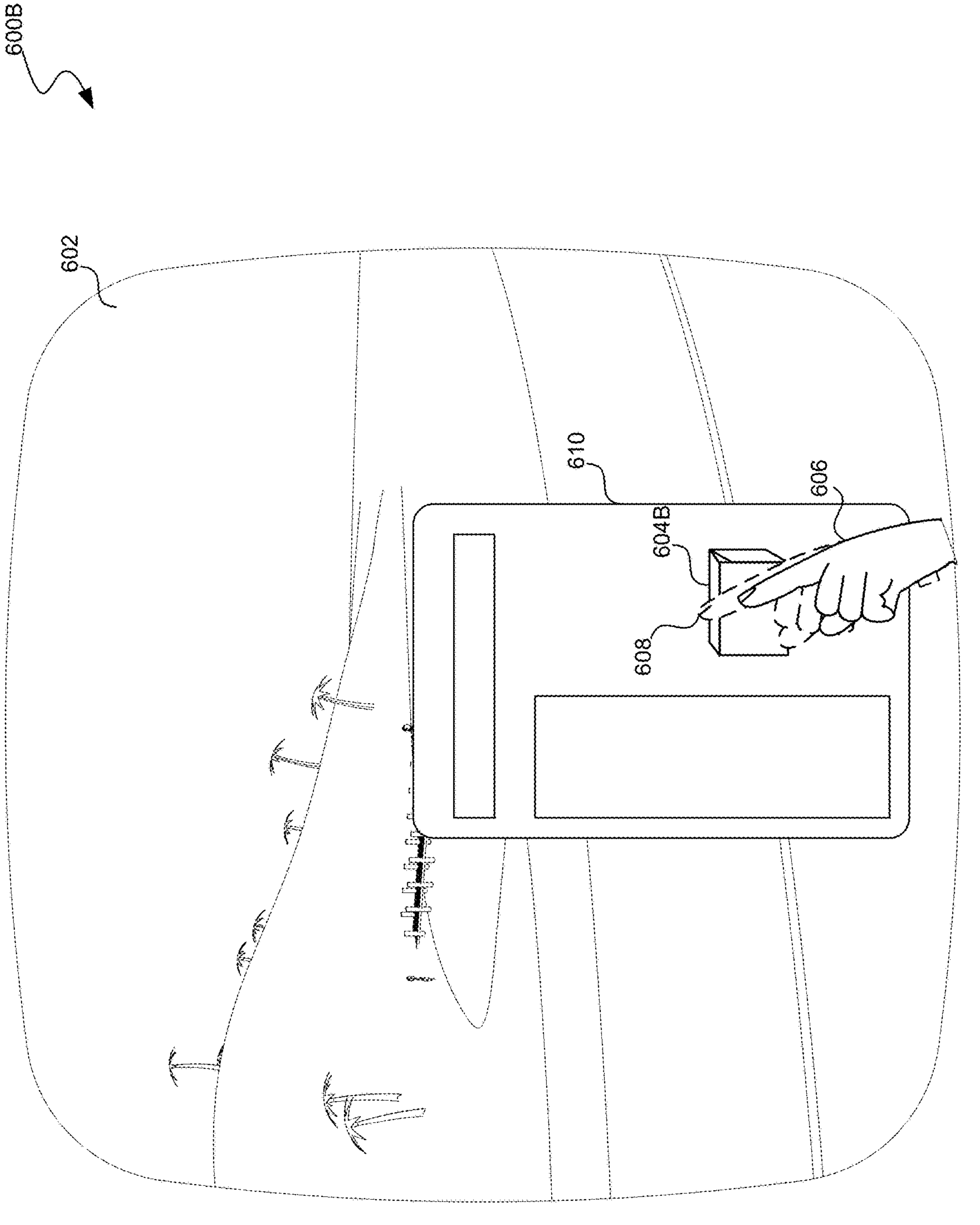
FIG. 6B is a conceptual diagram illustrating an example view from an artificial reality system of a first virtual hand interacting with a virtual button, and a second virtual hand, corresponding to a location of a physical hand, displayed when the physical hand at least partially extends beyond the virtual button.

FIG. 6B is a conceptual diagram illustrating an example view 600B from an XR system of a virtual hand 606 (i.e., a first representation of at least a first portion of a physical hand) interacting with a virtual button 604B, and a second representation 608 of at least a second portion of a physical hand, tracking movement of the physical hand, displayed when the physical hand at least partially extends beyond the virtual button 604B. Virtual button 604B can be visually compressed with respect to virtual button 604A of FIG. 6A, based on an interaction of virtual hand 606 with virtual button 604A. Upon reaching a maximum compression depth of virtual button 604B by virtual hand 606, and upon the physical hand continuing to push through virtual button 604B despite virtual button 604B reaching maximum compression, tracking of virtual hand 606 can be modified to be based on the position of virtual button 604B, and remain interacting with virtual button 604B instead of tracking the physical hand. However, once the physical hand has extended beyond virtual hand 606 by greater than a threshold (e.g., beyond the maximum compression of virtual button 604B), the XR system can display second representation 608 (a "ghost hand"), of a second portion of the physical hand, corresponding to the portion of the physical hand extending beyond virtual hand 606 (and virtual button 604B).

Figure 7:
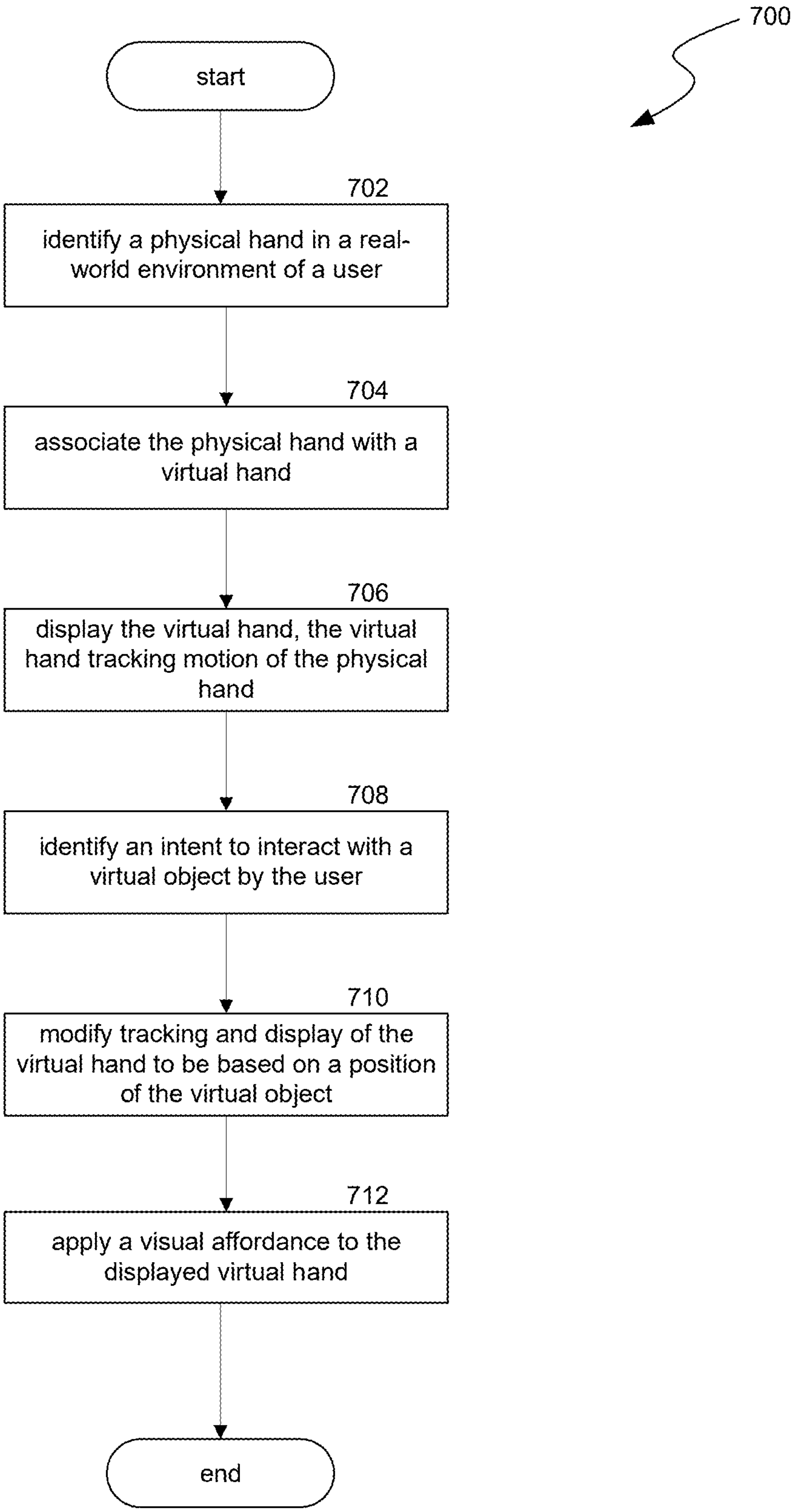
FIG. 7 is a flow diagram illustrating a process used in some implementations of the present technology for providing intent-based user interface modifications in an artificial reality environment, such as by applying one or more visual affordances to a virtual hand when at least a portion of a physical hand is separated from a virtual object.

FIG. 7 is a flow diagram illustrating a process 700 used in some implementations of the present technology for providing intent-based user interface modifications in an XR environment, such as by applying one or more effects to a virtual hand when at least a portion of a physical hand extends beyond a virtual object. In some implementations, process 700 can be performed as a response to a physical hand of a user being detected in a real-world environment of a user by an XR system, the XR system displaying a virtual object with which the user can interact. In some implementations, some or all of process 700 can be performed by an XR system including one or more XR devices, e.g., an XR head-mounted display (HMD) (such as XR HMD 200 of FIG. 2A and/or XR HMD 252 of FIG. 2B), one or more external processing components, one or more controllers (e.g., controller 276A and/or 276B of FIG. 2C), etc.

At block 702, process 700 can identify, by an XR device, a physical hand in a real-world environment of a user. In some implementations, process 700 can detect a physical hand of the user via one or more cameras integral with or in operable communication with the XR device in a manner similar to block 502 of FIG. 5. At block 704, process 700 can associate the physical hand with a virtual hand in the XR environment in a manner similar to block 504 of FIG. 5.

At block 706, process 700 can display the virtual hand on the XR device. In some implementations, as described above, process 700 can display the virtual hand as a default or generic virtual hand to which features of the physical hand were mapped, while in some implementations, process 700 can display the virtual hand as a true representation of the physical hand, e.g., by modifying a renderable template of a virtual hand. In some implementations, process 700 can display the virtual hand in 3D, when the physical hand is mapped to the virtual hand in 3D. The virtual hand can track motion of the physical hand in the real-world environment. For example, by identifying, capturing, and following motion of the physical hand and its features, process 700 can display motion of the virtual hand correlating to motion of the physical hand, e.g., if the physical hand moves right ten inches in the real-world environment, process 700 can display the virtual hand moving a corresponding virtual distance in the XR environment. At block 708, process 700 can identify an intent to interact with a virtual object, displayed on the XR device, by a user, in a manner similar to block 508 of FIG. 5.

At block 710, based on the identified intent, process 700 can modify tracking and display of the virtual hand to be based on a position of the virtual object, such that a position of the virtual hand is different from a position of the physical hand, in a manner similar to block 510 of FIG. 5. Thus, motion of the virtual hand can be based on the position of the virtual object instead of the motion of the virtual hand being based on motion of the physical hand. For example, if the virtual hand interacts with the virtual object (i.e., touches the virtual object), the virtual hand can lock to the virtual object and remain locked to the virtual object despite further motion of the physical hand away from the virtual object, at least to some threshold distance, as described further herein.

At block 712, as the physical hand is interacting with the virtual object and/or as the physical hand is within a first threshold distance of the virtual object after interaction, process 700 can apply a visual affordance to the virtual hand. In some implementations, process 700 can alternatively or additionally apply the visual affordance to the virtual object. Process 700 can determine that the physical hand is interacting with the virtual object and/or is within a first threshold distance of the virtual object after interaction using one or more cameras, one or more depth sensors, and/or one or more sensors of an inertial measurement unit (IMU) integral with or in operable communication with the XR system, such as is described further above with reference to FIG. 5.

In some implementations, a "visual affordance" can be a visual effect applied to the virtual hand and/or virtual object. For example, process 700 can apply a glowing effect, a shadowing effect, a highlighting effect, a color change, etc. In some implementations, the visual affordance can be a visual indicator of the distance between the user's physical hand and the virtual hand (which can no longer be tracking the physical hand). In some implementations, the visual affordance can dynamically grow stronger as the physical hand gets further from the virtual hand and/or the virtual object, or can grow weaker as the physical hand gets further from the virtual hand and/or the virtual object. In another example, process 700 can apply a static visual affordance (e.g., a glowing effect, a shadowing effect, a highlighting effect, a rippling effect, a color change, etc.) when a specified point on the physical hand is outside of a first threshold distance of the corresponding specified point on the virtual object, as defined above with respect to FIG. 5. Further, it is contemplated that, in some examples, process 500 can begin applying the visual affordance after a virtual button has reached its maximum compression.

In some implementations, the visual affordance can be a glow effect applied to the virtual hand. Initially, the glow effect can be a first size, starting from the specified point on the physical hand that initially contacted the virtual object. As the two specified points move further apart, the glow can expand to a second size, and can dynamically become bigger or smaller based on the distance between the two points. For example, as the initial contact point on the physical hand pushes past the initial contact point on the virtual object (e.g., pushing through and past the maximum compression of a virtual button in an x-direction at least partially transverse to the contact surface of the virtual button), the glow effect can dynamically grow in size. Conversely, as the physical hand retracts back toward the initial contact point on the virtual object, the glow effect can dynamically decrease in size. In some implementations, when the initial contact point on the physical hand retracts back and reaches either the maximum compression of a virtual button and/or the initial contact point on the virtual object (which, in the case of a virtual button, can be a point where the virtual button becomes uncompressed), the glow effect can reach a minimum size and/or be unapplied. As the physical hand again tracks the virtual hand and as the physical hand continues to retract from the virtual object, the glow effect can continue to remain unapplied.

The visual affordance can be applied at any point on the virtual hand. For example, the visual affordance can initially be applied at the initial point of contact of the virtual hand with the virtual object (e.g., the fingertip). In some implementations, as the initial point of contact of the physical hand continues past the initial point of contact on the virtual object (and as the virtual hand ceases tracking of the physical hand), the visual affordance can extend further down the virtual hand (e.g., a glow effect can dynamically extend from the fingertip of the virtual hand to a portion of the virtual hand corresponding to the portion of the physical hand currently in contact with the virtual object). For example, a glow effect can initially be applied to a fingertip of the virtual hand as the fingertip of the virtual hand/physical hand initially contacts the virtual object. The initial contact point on the physical hand can then extend 5 cm away from the user beyond the initial contact point on the virtual object in an x-direction. Although the virtual hand can stop tracking the physical hand, the glow effect can correspondingly be applied 5 cm up the virtual hand to visualize that the initial contact point of the physical hand has extended past the initial contact point of the virtual object by 5 cm.

Although described in this example with respect to dynamically changing size of the glow effect, any of one or more attributes of the visual affordance can be similarly changed or eliminated based on separation of initial contact points of the physical hand and the virtual object, such as color, tone, brightness, intensity, transparency, animation (e.g., a visual shaking, vibration, and/or rippling effect), and/or the like. In some examples, the visual affordance can change appearance. For example, a glow effect can transform into a fire effect (e.g., visualizing a burning finger) at a certain point of separation (e.g., a threshold distance) between initial contact points of the physical hand and the virtual object, and, in some implementations, can further change in size, intensity, brightness, etc., as the separation increases.

Further, although described primarily herein as being a “visual affordance,” it is contemplated that similar techniques can be applied to dynamically increase and/or decrease non-visual attributes, such as sound attributes (e.g., an audio file associated with a virtual object can dynamically be increased or decreased in volume, tone, etc.) and/or haptic attributes. For example, when an XR environment is accessed by a user via one or more controllers, increased separation between initial contact points of a controller and a virtual object, away from the user, can cause increased intensity of haptic effects applied to the corresponding controller. When accessing the XR environment using hand gesture instead of controllers, and by applying a visual affordance to the virtual hand, the visual affordance can visualize the impulses of the haptic feedback used for controllers, enabling the users to perceive it through sight.

Similar to that described above with respect to FIG. 5, process 700 can further detect motion of the specified point on the physical hand away from the corresponding specified point on the virtual object by greater than a second threshold amount, the second threshold amount being greater than the first threshold amount. In some implementations, upon detecting such motion of the specified point of the physical hand away from the corresponding specified point on the virtual object, process 700 can modify tracking and display of the virtual hand to again be tracking motion of the physical hand, and can cease display of the visual affordance. In other words, process 500 can determine that it is no longer the user’s intent to interact with the virtual object, unlock the virtual hand from its interaction with the virtual object, and A) track the physical hand with the virtual hand in the XR environment and B) remove the visual affordance from the virtual hand and/or the virtual object.

Although the implementations of FIG. 5 and FIG. 7 are described separately herein, it is contemplated that they can be freely combined. For example, in some implementations, process 700 can, upon modifying tracking and display of the virtual hand to be based on the position of the virtual object instead of the physical hand, both display the second representation, of at least the second portion of the physical hand in addition to the virtual hand, and display a visual affordance on the virtual hand and/or virtual object. In some implementations, and as described above, as the physical hand extends further through, beyond, and/or away from the virtual object, the intensity of the visual affordance can increase, and/or conversely decrease, as described above.

Figure 8A:
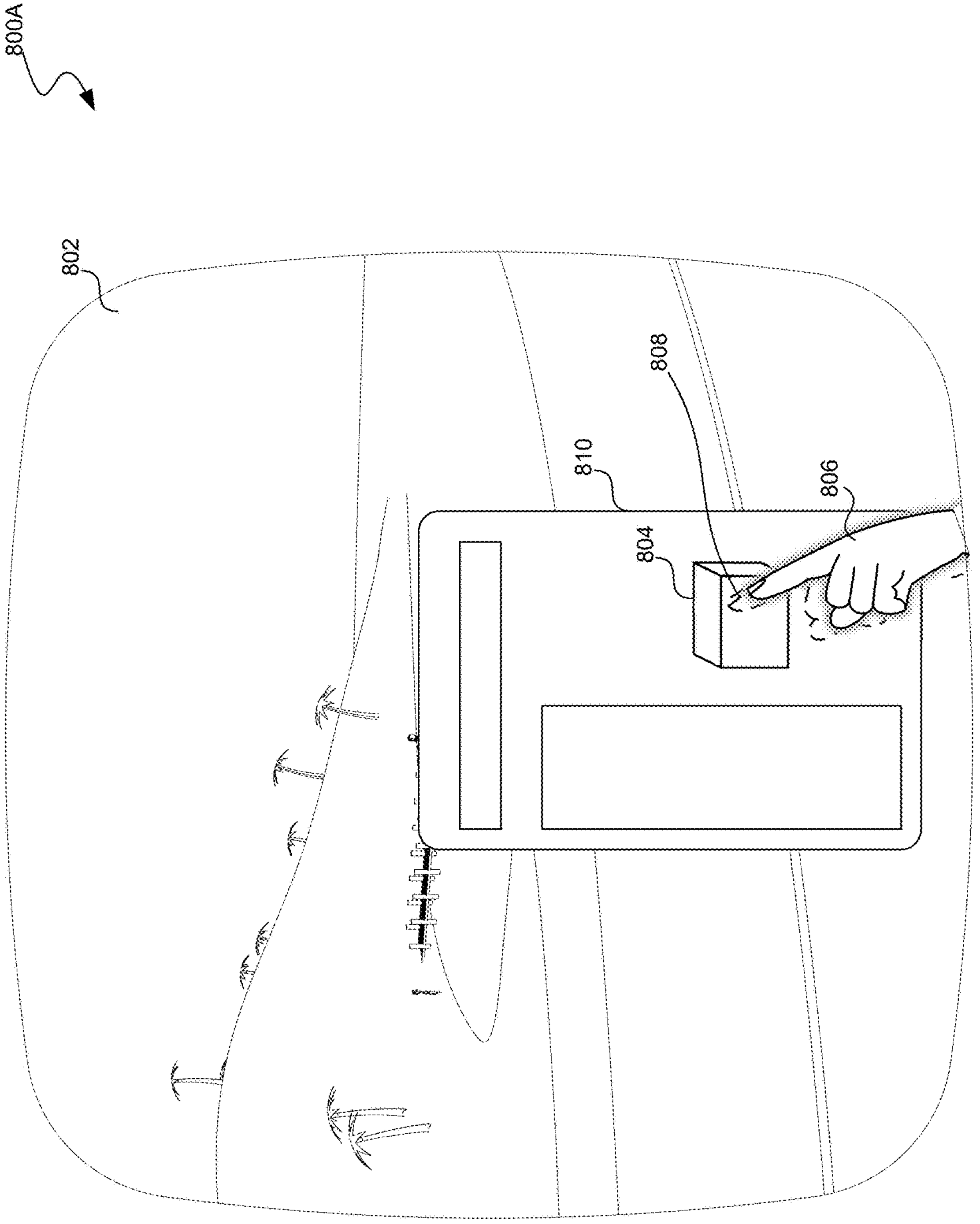
FIG. 8A is a conceptual diagram illustrating an example view from an XR system of a glow effect applied to a virtual hand when a specified point on a physical hand is separated from a corresponding specified point on a virtual button.

FIG. 8A is a conceptual diagram illustrating an example view 800A from an XR system of a glow effect applied to a virtual hand 806 when a specified point on a physical hand 808 is separated from a corresponding specified point on a virtual button 804, included in a system UI 810 overlaid onto an XR environment 802. In view 800A, the pointer finger fingertip of physical hand 808 can extend beyond an initial contact point on virtual button 804 more than a first threshold amount (e.g., more than 0 cm, 1 cm, or any other threshold distance). Based on this separation, a glow effect can be applied to virtual hand 806. Although shown in view 800A merely for reference as to the location of physical hand 808A, it is contemplated that a representation of physical hand 808A can be omitted from the display on the XR device. However, in some implementations, it is contemplated that a representation of physical hand 808 can instead be displayed on the XR system, such as is described with reference to FIGS. 6A and 6B.

Figure 8B:
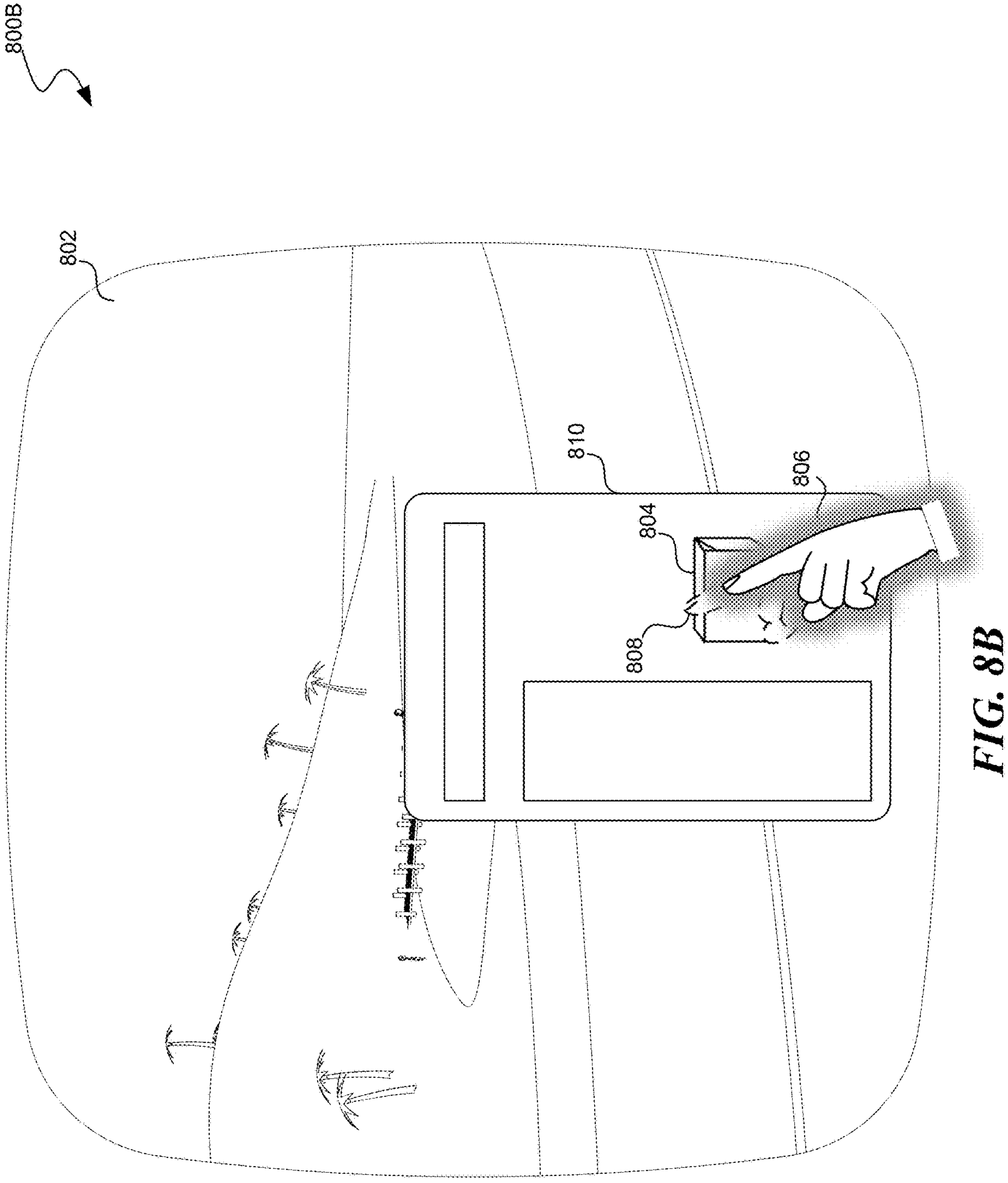
FIG. 8B is a conceptual diagram illustrating an example view from an XR system of an intensified glow effect applied to a virtual hand when a specified point on a physical hand is further separated from a corresponding specified point on a virtual button.

FIG. 8B is a conceptual diagram illustrating an example view 800B from an XR system of an intensified glow effect applied to a virtual hand 806 when a specified point on a physical hand 808 is further separated from a corresponding specified point on a virtual button 804, relative to that shown in view 800A of FIG. 8A. As shown in view 800B, based on the increased separation, the glow effect can increase. For example, the glow effect can become bigger in size, darker in color, more opaque, denser, brighter in color, lighter in color, or any combination thereof. Similar to that described with respect to FIG. 8A, it is contemplated that a representation of physical hand 808 may or may not additionally be shown in view 800B. Further, although illustrated in FIGS. 8A and 8B as applying a glow effect to virtual hand 806, it is contemplated that a glow effect can similarly, alternatively or additionally, be applied to virtual button 804.

Figure 9:
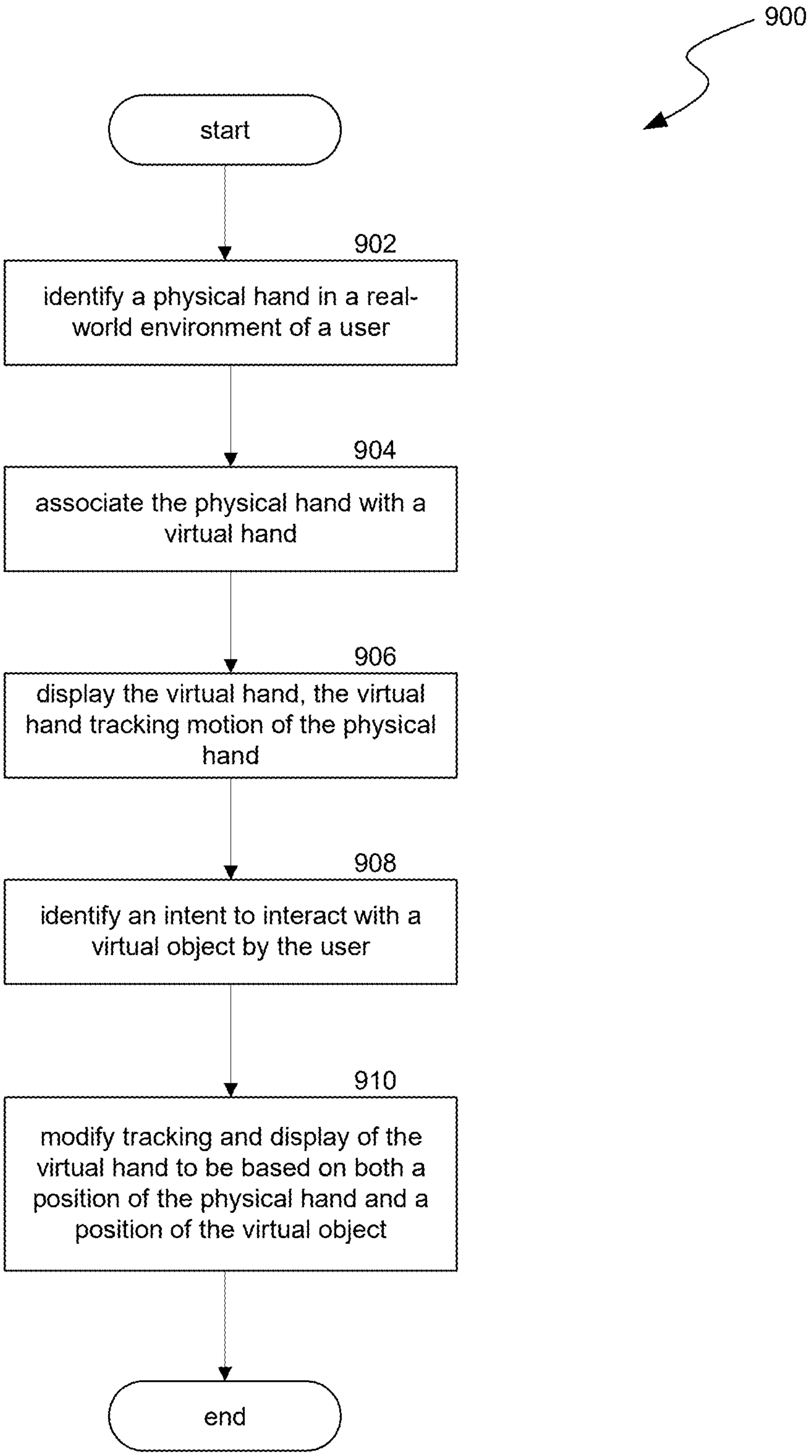
FIG. 9 is a flow diagram illustrating a process used in some implementations of the present technology for providing intent-based user interface modifications in an artificial reality environment, such as by providing wrist pinning for a virtual hand locked to a virtual object.

FIG. 9 is a flow diagram illustrating a process 900 used in some implementations of the present technology for providing intent-based user interface modifications in an XR environment, such as by providing wrist pinning for a virtual hand corresponding to a physical hand. In some implementations, process 900 can be performed as a response to a physical hand of a user being detected in a real-world environment of a user by an XR system, the XR system displaying a virtual object with which the user can interact. In some implementations, some or all of process 900 can be performed by an XR system including one or more XR devices, e.g., an XR head-mounted display (HMD) (such as XR HMD 200 of FIG. 2A and/or XR HMD 252 of FIG. 2B), one or more external processing components, one or more controllers (e.g., controller 276A and/or 276B of FIG. 2C), etc.

At block 902, process 900 can identify, by an XR device, a physical hand in a real-world environment of a user in a manner similar to block 502 of FIG. 5. At block 904, process 900 can associate the physical hand with a virtual hand in the XR environment in a manner similar to block 504 of FIG. 5. At block 906, process 900 can display the virtual hand on the XR device in a manner similar to block 506 of FIG. 5. At block 908, process 900 can identify an intent to interact with a virtual object similar to block 508 of FIG. 5.

At block 910, based on the identified intent to interact, process 900 can modify tracking and display of the virtual hand to be based on both a position of the physical hand and a position of the virtual object, such that a position of the virtual hand is different from a position of the physical hand. In other words, instead of the motion of the virtual hand being solely based on motion of the physical hand, motion of the virtual hand can further be based on the position of the virtual object. For example, if the virtual hand touches the virtual object, process 900 can lock the virtual hand to the virtual object at specified points on the virtual hand and virtual object where the initial contact happened (or between a specified point on the virtual hand and an interactable surface of the virtual object on which the initial contact happened), and stop tracking movement of the physical hand away from such a specified point or surface of the virtual object in at least one dimension (e.g., a z-axis dimension).

However, movement of the physical hand beyond the virtual object in a z-axis direction or in a rotational direction (e.g., roll rotation-clockwise or counterclockwise motion), could cause corresponding rotation of the virtual hand that would make the virtual hand arch or move upward visually in an uncontrollable manner or unnatural manner (e.g., simulating pressure being applied to the virtual object by the virtual hand in an amount corresponding to the how far a fingertip or other portion of the hand has pressed through the virtual object). Thus, instead of rendering such rotation of the virtual hand, process 900 can, in some implementations, blend the wrist rotation of the physical hand with the wrist rotation of the virtual hand that would otherwise be caused by the motion of the physical hand, while locking the virtual hand to the virtual object at the point or surface specified above. In other words, in some implementations, process 900 can restrict the amount of wrist rotation that is shown by the virtual hand in such cases, thereby creating a softer movement that prevents the virtual hand from floating continuously higher or moving awkwardly as the virtual finger of the virtual hand is locked to the virtual object.

Although the implementations of FIG. 5, FIG. 7, and FIG. 9 are described separately herein, it is contemplated that they can be freely combined. For example, in some implementations, process 900 can, upon modifying tracking and display of the virtual hand to be based on a position of the virtual object, A) display a second representation, of at least a second portion of the physical hand, in addition to the virtual hand, B) display a visual affordance on the virtual hand and/or virtual object, and/or C) restrict wrist rotation of the virtual hand. In some implementations, as the physical hand extends further through, beyond, and/or away from the virtual object, the intensity of the visual affordance can increase, and/or conversely decrease, as described above. Further, in some implementations, as the physical hand extends further through, beyond, and/or away from the virtual object, the degree of restriction of wrist rotation for the virtual hand can increase, and/or conversely decrease. For example, the further a fingertip extends beyond its initial contact point with a virtual object, the wrist rotation of the virtual object can more closely track the wrist rotation of the physical hand and less closely track the wrist rotation that would otherwise be rendered (which would otherwise cause a larger amount of wrist rotation of the virtual hand).

Figure 10A:
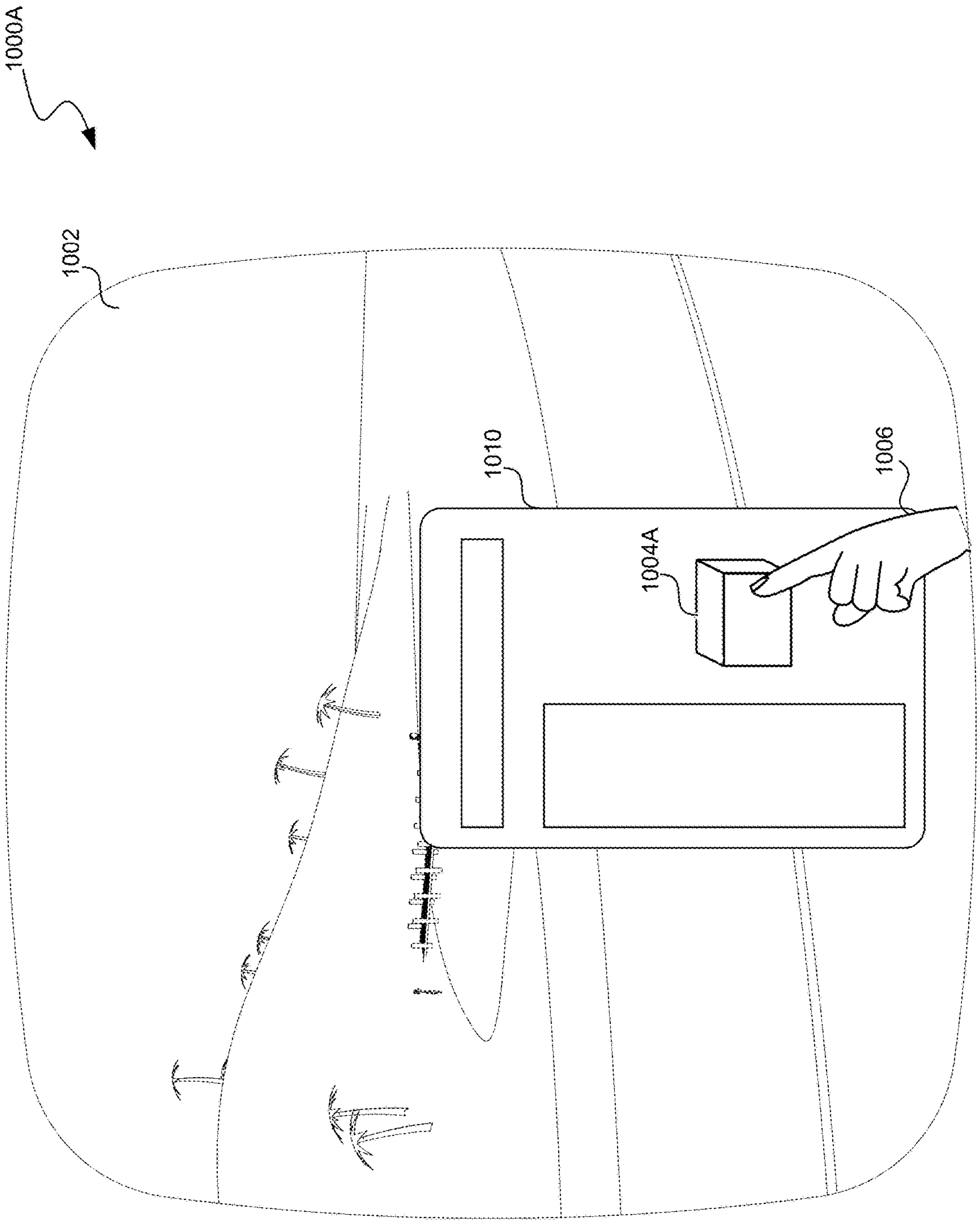
FIG. 10A is a conceptual diagram illustrating an example view from an artificial reality system of a virtual hand being locked to a virtual object when a physical hand interacts with the virtual object.

FIG. 10A is a conceptual diagram illustrating an example view 1000A from an XR system of a virtual hand 1006 being locked to a virtual button 1004A when a physical hand (not shown) interacts with the virtual button 1004A, included in a system UI 1010 overlaid onto an XR environment 1002. Virtual button 1004A can be an exemplary virtual object with which a user of the XR device can interact. The user can use their physical hand to "touch" the surface of virtual button 1004A, which is reflected as virtual hand 1006 touching virtual button 1004A, as virtual hand 1006 is tracking the position and motion of the physical hand in view 1000A. The physical hand can "touch" virtual button 1004A at a particular point on the physical hand (e.g., at the fingertip of the pointer finger of the physical hand, corresponding in this example to virtual hand 1006), and at a corresponding particular point on virtual button 1004A (e.g., the point corresponding to the fingertip of the pointer finger of the physical hand, corresponding in this example to virtual hand 1006).

Figure 10B:
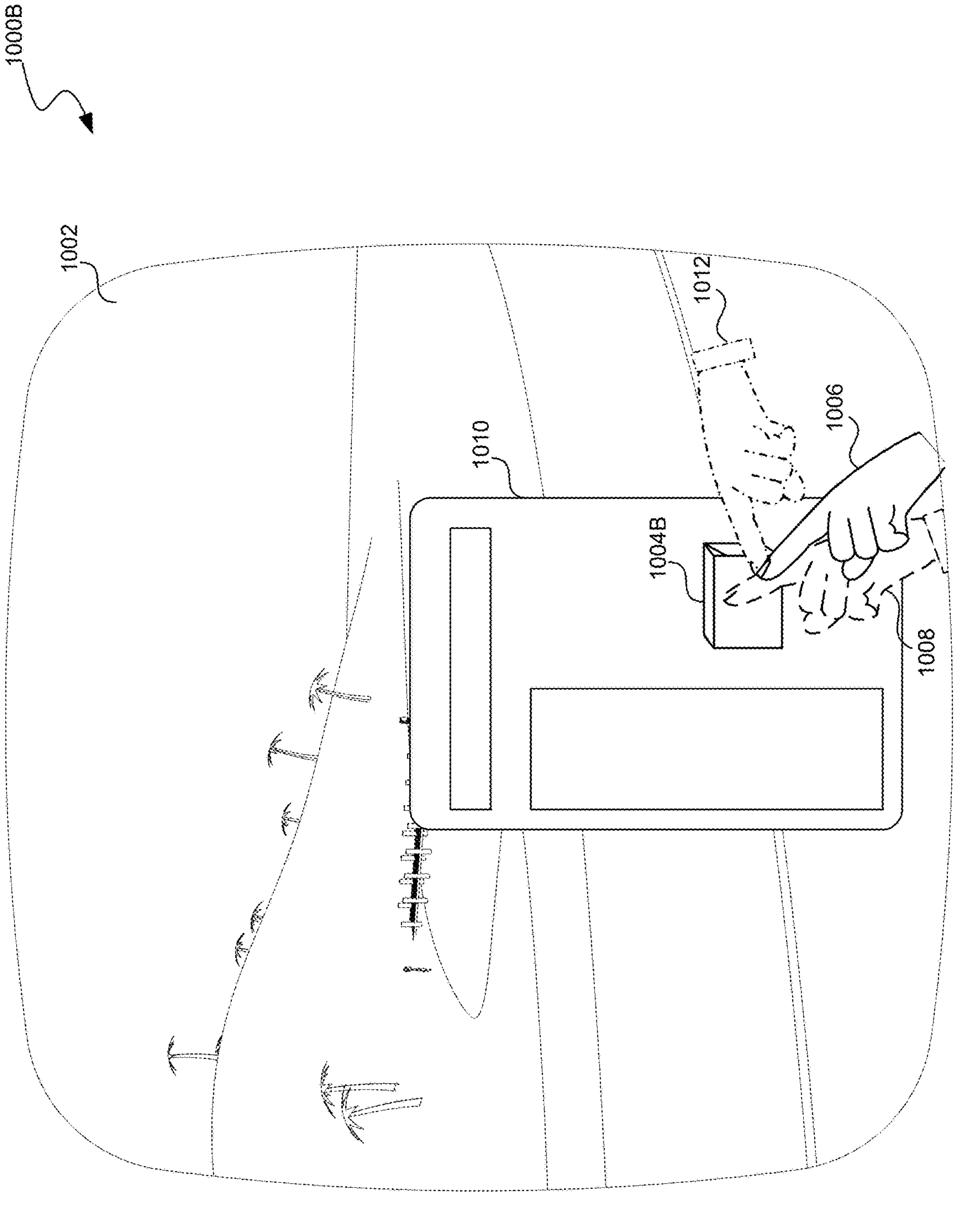
FIG. 10B is a conceptual diagram illustrating an example view from an artificial reality system of a virtual hand, locked to a virtual object, and at least partially tracking a position of a physical hand when a specified point on the physical hand is separated from a corresponding specified point on a virtual button.

FIG. 10B is a conceptual diagram illustrating an example view 1000B from an XR system of a virtual hand 1006, locked to a virtual button 1004B, and at least partially tracking a position of a physical hand 1008 when the physical hand 1008 extends at least partially beyond the virtual button 1004B. From view 1000A, physical hand 1008 can continue to extend forward (i.e., away from the user in a z-axis direction) and compress virtual button 1004B to its maximum compression limit (e.g., 1 cm). In some implementations, the location of virtual hand 1006 can continue to track the location of physical hand 1008 until virtual button 1004B reaches its maximum compression limit. Upon reaching virtual button 1004B's maximum compression limit, virtual hand 1006 can then "lock" to virtual button 1004B at a position defined by the contact point of virtual hand 1006/physical hand 1008 (e.g., the pointer finger fingertip) with the corresponding contact point on virtual button 1004B, at least in a z-axis direction. In other implementations, virtual hand 1006 can "lock" to the surface of virtual button 1004B upon initial contact (such as is shown in view 1000A), and further movement of virtual hand 1006 (e.g., compressing virtual button 1004B) can be based on both the location of virtual button 1004B and the location of physical hand 1008, such that virtual hand 1006 remains in contact with virtual button 1004B despite separation of the particular initial contact point of physical hand 1008 from the corresponding initial contact point on virtual button 1004A (such initial contact points are described above with reference to FIG. 10A). In such implementations, physical hand 1008 can remain locked to virtual button 1004B on an x-, y-, and/or z-axis, despite movement of physical hand 1008. However, it is contemplated that, in some implementations, physical hand 1008 can continue move on the interactable surfaces of virtual button 1004B in an x-, y-, and/or z-axis direction while being locked to virtual button 1004B. While being locked to virtual button 1004B, virtual hand 1006 can cease tracking movement of physical hand 1008 in one or more directions, such that the positions of physical hand 1008 and virtual hand 1006 are different.

After virtual button 1004B is compressed to its maximum compression limit, the particular point on physical hand 1008 (e.g., the pointer finger fingertip) can continue to separate from the corresponding particular point on virtual button 1004B (e.g., extend through and beyond the interactable surface of virtual button 1004B). Meanwhile, virtual hand 1006 can remain "locked" to the interactable surface of virtual button 1004B at one of the points described above (e.g., the initial contact points on the virtual hand 1006/virtual button 1004B where the initial touch interaction occurred, or the contact points on virtual hand 1006/virtual button 1004B where virtual button 1004B reached its maximum compression) at least in a z-axis direction. By physical hand 1008 continuing forward beyond virtual button 1004B, and by virtual hand 1006 continuing to attempt to compress virtual button 1004B beyond its maximum compression limit, virtual hand 1006 would be caused to rotate at the wrist at a pivot point defined by one of the contact points described above, and at an amount corresponding to the amount of separation of the contact point on physical hand 1008 (e.g., the pointer finger fingertip of physical hand 1008) from its corresponding contact point on virtual button 1004B (e.g., the initial contact point or the contact point when virtual button 1004B was fully compressed). In other words, the greater the separation between the two points, the further virtual hand 1006 would be caused to rotate.

For example, as shown in view 1000B, physical hand 1008's illustrated extension beyond the maximum compression limit of virtual button 1004B would cause virtual hand to be rendered as shown in representation 1012 (but which is not rendered on the XR system, as indicated by the alternate dotted-dashed lines). Instead, the intent-based UI modification system described herein can blend the wrist rotation of physical hand 1008 with the wrist rotation indicated by representation 1012 in order to determine the wrist rotation of virtual hand 1006, which can then be rendered as illustrated in view 1000B. Thus, relative to view 1000A, virtual hand 1006 can be moved rotationally about the above-defined pivot point based on the rotations of representation 1012 and physical hand 1008, while remaining locked to virtual button 1004B. In some implementations, a representation of physical hand 1008 can further be rendered by the XR system (e.g., as a "ghost hand" as described further herein). However, in other implementations, a representation of physical hand 1008 (and/or physical hand 1008 itself) need not be rendered, as indicated by the dashed lines.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing intent-based user interface modifications in an artificial reality environment, the method comprising:

identifying, by an artificial reality system, a physical hand in a real-world environment of a user;

associating the physical hand with a virtual hand in the artificial reality environment, the virtual hand being a first representation of at least a first portion of the physical hand;

displaying the virtual hand by the artificial reality system, the virtual hand tracking motion of the physical hand in the real-world environment;

identifying an intent, to interact with a virtual object by the user, based on a gesture directed toward the virtual object or a proximity of the physical hand with the virtual object, wherein the intent to interact is a pressing motion by the physical hand relative to the virtual object;

based on the identifying the intent to interact, displaying the virtual hand, in the pressing motion, compressing the virtual object;

determining that the virtual object has reached its maximum compression based on the pressing motion of the physical hand relative to the virtual object;

in response to the identifying the intent and the determining that the virtual object has reached its maximum compression, modifying tracking and display of the virtual hand to be based on a position of the virtual object, such that a position of the virtual hand is different from a position of the physical hand; and displaying, in addition to the displayed virtual hand, a second representation of at least a second portion of the physical hand, the second representation tracking a position of the at least the second portion of the physical hand.

2. The method of claim 1, wherein the second representation, of the at least the second portion of the physical hand, includes at least one degradation relative to the displayed virtual hand, and wherein the at least one degradation including one or more of fading, darkening, applying partial transparency, simplifying, or any combination thereof, relative to the displayed virtual hand.

3. The method of claim 1, wherein the displayed virtual hand includes one or more effects.

4. The method of claim 3, wherein the one or more effects includes a glow effect.

5. The method of claim 1, wherein the modifying the tracking of the virtual hand is further based on a determination that the position of a specified point on the physical hand is separated from a corresponding specified point on the virtual object by greater than a threshold amount.

6. The method of claim 5, further comprising:

applying one or more effects to the displayed virtual hand, wherein at least one of the one or more effects increases in intensity as the specified point on the physical hand is further separated from the corresponding specified point on the virtual object.

7. The method of claim 6, wherein the threshold amount is a first threshold amount, and wherein the method further comprises:

detecting motion of the specified point on the physical hand away from the corresponding specified point on the virtual object by greater than a second threshold amount, the second threshold amount being greater than the first threshold amount; and upon the detecting the motion of the specified point on the physical hand away from the specified point on the virtual object by greater than the second threshold amount:

modifying tracking and display of the virtual hand to be tracking motion of the physical hand; and ceasing display of the one or more effects.

8. The method of claim 7, wherein, upon the detecting the motion of the specified point on the physical hand away from the specified point on the virtual object by greater than the second threshold amount, the method further comprises:

ceasing display of the second representation of the at least the second portion of the physical hand.

9. The method of claim 5, wherein the threshold amount is a first threshold amount, and wherein the method further comprises:

detecting motion of the specified point on the physical hand away from the corresponding specified point on the virtual object by greater than a second threshold amount, the second threshold amount being greater than the first threshold amount; and upon the detecting the motion of the specified point on the physical hand away from the specified point on the virtual object by greater than the second threshold amount:

modifying tracking and display of the virtual hand to be tracking motion of the physical hand; and ceasing display of the second representation of the at least the second portion of the physical hand.

10. The method of claim 5, wherein the threshold amount is a first threshold amount, and wherein the method further comprises:

detecting motion of the specified point on the physical hand away from the corresponding specified point on the virtual object by greater than a second threshold amount, the second threshold amount being greater than the first threshold amount, based on the detecting the motion of the motion of the specified point on the physical hand away from the corresponding specified point on the virtual object by greater than the second threshold amount:

transitioning display of the virtual hand to the position of the physical hand at a specified movement rate; and ceasing display of the second representation of the at least the second portion of the physical hand.

11. The method of claim 1, wherein the virtual hand is snapped to the virtual object while the virtual hand is interacting with the virtual object.

12. A non-transitory computer-readable storage medium storing instructions, for providing intent-based user interface modifications in an artificial reality environment, the instructions, when executed by a computing system, cause the computing system to:

identify, by an artificial reality system, a physical hand in a real-world environment of a user;

associate the physical hand with a first virtual hand in the artificial reality environment;

display the first virtual hand, the first virtual hand tracking motion of the physical hand in the real-world environment;

identify an intent, to interact with a virtual object by the user, based on an identified association between the virtual object and the physical hand, wherein the intent to interact is a pressing motion by the physical hand relative to the virtual object;

based on the identifying the intent to interact, display the first virtual hand, in the pressing motion, compressing the virtual object;

determine that the virtual object has reached its maximum compression based on the pressing motion of the physical hand relative to the virtual object;

in response to the identifying the intent and the determining that the virtual object has reached its maximum compression, modify tracking and display of the first virtual hand to be based on a position of the virtual object, such that a position of the first virtual hand is different from a position of the physical hand; and display, in addition to the first virtual hand, a second virtual hand tracking motion of the physical hand in the real-world environment.

13. The non-transitory computer-readable storage medium of claim 12, wherein the identified association includes A) a gesture, of the physical hand, directed toward the virtual object, B) a proximity of the physical hand with the virtual object, or C) both.

14. The non-transitory computer-readable storage medium of claim 13, wherein the modifying the tracking of the first virtual hand is further based on a determination that the position of a specified point on the physical hand is separated from a corresponding specified point on the virtual object by greater than a threshold amount.

15. The non-transitory computer-readable storage medium of claim 14, wherein the instructions, when executed by the computing system, further cause the computing system to:

applying one or more effects to the displayed first virtual hand, wherein at least one of the one or more effects increases in intensity as the specified point on the physical hand is further separated from the corresponding specified point on the virtual object.

16. The non-transitory computer-readable storage medium of claim 15, wherein the threshold amount is a first threshold amount, and wherein the instructions, when executed by the computing system, further cause the computing system to:

detect motion of the specified point on the physical hand away from the corresponding specified point on the virtual object by greater than a second threshold amount, the second threshold amount being greater than the first threshold amount; and upon the detecting the motion of the specified point on the physical hand away from the specified point on the virtual object by greater than the second threshold amount:

modify tracking and display of the first virtual hand to be tracking motion of the physical hand; and cease display of the one or more effects.

17. The non-transitory computer-readable storage medium of claim 16, wherein, upon the detecting the motion of the specified point on the physical hand away from the specified point on the virtual object by greater than the second threshold amount, the instructions, when executed by the computing system, further cause the computing system to:

cease display of the second virtual hand.

18. A computing system for providing intent-based user interface modifications in an artificial reality environment, the computing system comprising:

one or more processors; and one or more memories storing instructions that, when executed by the one or more processors, cause the computing system to:

identify, by an artificial reality system, a physical hand in a real-world environment of a user;

associate the physical hand with a first virtual hand in the artificial reality environment;

display the first virtual hand, the first virtual hand tracking motion of the physical hand in the real-world environment;

identify an intent, to interact with a virtual object by the user, based on an identified association between the virtual object and the physical hand, wherein the intent to interact is a pressing motion by the physical hand relative to the virtual object;

based on the identifying the intent to interact, display the first virtual hand, in the pressing motion, compressing the virtual object;

determine that the virtual object has reached its maximum compression based on the pressing motion of the physical hand relative to the virtual object;

in response to the identifying the intent and the determining that the virtual object has reached its maximum compression, modify tracking and display of the first virtual hand to be based on a position of the virtual object, such that a position of the first virtual hand is different from a position of the physical hand; and display, in addition to the first virtual hand, a second virtual hand tracking motion of the physical hand in the real-world environment.

19. The computing system of claim 18, wherein the modifying the tracking of the first virtual hand is based on a determination that the position of a specified point on the physical hand is separated from a corresponding specified point on the virtual object by greater than a first threshold amount, and wherein the instructions, when executed by the one or more processors, further cause the computing system to:

detect motion of the specified point on the physical hand away from the corresponding specified point on the virtual object by greater than a second threshold amount, the second threshold amount being greater than the first threshold amount; and upon the detecting the motion of the specified point on the physical hand away from the specified point on the virtual object by greater than the second threshold amount:

modify tracking and display of the first virtual hand to track motion of the physical hand; and cease display of the second virtual hand.

20. The computing system of claim 18, wherein the modifying the tracking of the first virtual hand is based on a determination that the position of a specified point on the physical hand is separated from a corresponding specified point on the virtual object by greater than a first threshold amount, and wherein the instructions, when executed by the one or more processors, further cause the computing system to:

detect motion of the specified point on the physical hand away from the corresponding specified point on the virtual object by greater than a second threshold amount, the second threshold amount being greater than the first threshold amount; and based on the detecting the motion of the specified point on the physical hand away from the corresponding specified point on the virtual object by greater than the second threshold amount:

transition display of the first virtual hand to the position of the physical hand at a specified movement rate; and cease display of the second virtual hand.

* * * * *